United States Patent
Ohtsu et al.

(10) Patent No.: US 9,665,021 B2
(45) Date of Patent: May 30, 2017

(54) HEAT TREATING APPARATUS FOR POWDER PARTICLES AND METHOD OF PRODUCING TONER

(75) Inventors: Takeshi Ohtsu, Toride (JP); Yuichi Mizo, Toride (JP); Hironori Minagawa, Moriya (JP); Takakuni Kobori, Toride (JP); Kohji Takenaka, Toride (JP); Junichi Hagiwara, Tsuchiura (JP); Daisuke Ito, Tsuchiura (JP); Kunihiko Kawakita, Iga (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 560 days.

(21) Appl. No.: 14/123,961

(22) PCT Filed: Jun. 11, 2012

(86) PCT No.: PCT/JP2012/065438
§ 371 (c)(1),
(2), (4) Date: Dec. 4, 2013

(87) PCT Pub. No.: WO2012/173263
PCT Pub. Date: Dec. 20, 2012

(65) Prior Publication Data
US 2014/0096409 A1 Apr. 10, 2014

(30) Foreign Application Priority Data
Jun. 13, 2011 (JP) .................................. 2011-131144

(51) Int. Cl.
*F26B 17/00* (2006.01)
*F26B 3/08* (2006.01)
(Continued)

(52) U.S. Cl.
CPC .............. *G03G 9/0804* (2013.01); *B01J 2/16* (2013.01); *B01J 8/1836* (2013.01); *G03G 9/081* (2013.01);
(Continued)

(58) Field of Classification Search
CPC ............. G03G 9/0827; G03G 9/08755; G03G 9/0819; G03G 9/0804; G03G 9/0815; G03G 9/081; B01J 2/16; B01J 8/1836
(Continued)

(56) References Cited

U.S. PATENT DOCUMENTS

| 4,736,527 A * | 4/1988 | Iwamoto ............... F26B 17/103 264/15 |
| 8,455,167 B2 | 6/2013 | Shiotari et al. |

(Continued)

FOREIGN PATENT DOCUMENTS

| JP | 59-125742 A | 7/1984 |
| JP | 59-127662 A | 7/1984 |

(Continued)

OTHER PUBLICATIONS

Chinese Office Action dated Oct. 10, 2015 in Chinese Application No. 201280029172.0.
(Continued)

*Primary Examiner* — Kenneth Rinehart
*Assistant Examiner* — John McCormack
(74) *Attorney, Agent, or Firm* — Fitzpatrick, Cella, Harper & Scinto

(57) ABSTRACT

A heat treating apparatus for powder particles including a cylindrical treating chamber; a powder particle-supplying unit; a hot air-supplying unit that supplies hot air for heat-treating powder particles; a cold air-supplying unit that supplies cold air for cooling the heat-treated powder particles; a regulating unit for regulating a flow of the supplied (Continued)

powder particles; and a recovering unit that recovers the heat-treated powder particles. The regulating unit is a substantially circular columnar member, the hot air-supplying unit has an outlet opposite to the upper end portion of the columnar member, and the regulating unit is equipped with a substantially conic distributing member for distributing the supplied hot air in a circumferential direction and a rotating member for rotating the distributed hot air in a spiral manner, on the center of the upper end portion.

12 Claims, 5 Drawing Sheets

(51) Int. Cl.
G03G 9/08 (2006.01)
B01J 2/16 (2006.01)
B01J 8/18 (2006.01)
G03G 9/087 (2006.01)

(52) U.S. Cl.
CPC ......... *G03G 9/0815* (2013.01); *G03G 9/0819* (2013.01); *G03G 9/0827* (2013.01); *G03G 9/08755* (2013.01)

(58) Field of Classification Search
USPC ......... 34/371, 582, 591, 594, 359, 585, 360, 34/363; 430/137.1, 137.18, 137.2
See application file for complete search history.

(56) References Cited

U.S. PATENT DOCUMENTS

| | | | |
|---|---|---|---|
| 2002/0031714 A1* | 3/2002 | Fumita | G03G 9/0806 430/137.17 |
| 2007/0214676 A1* | 9/2007 | Zahedi | F23J 15/025 34/86 |
| 2008/0286680 A1* | 11/2008 | Norikane | B01J 2/04 430/110.4 |
| 2013/0323638 A1 | 12/2013 | Minagawa et al. | |
| 2014/0101966 A1 | 4/2014 | Minagawa et al. | |
| 2014/0120468 A1 | 5/2014 | Mizo et al. | |
| 2014/0137428 A1 | 5/2014 | Takenaka et al. | |

FOREIGN PATENT DOCUMENTS

| | | | |
|---|---|---|---|
| JP | 62-132534 A | | 6/1987 |
| JP | 62-133466 A | | 6/1987 |
| JP | 4-126534 A | | 4/1992 |
| JP | 2000-29241 A | | 1/2000 |
| JP | 2000-140661 A | | 5/2000 |
| JP | 2009020386 A | * | 1/2009 |
| JP | 2011-128487 A | | 6/2011 |
| JP | 2011-128488 A | | 6/2011 |
| WO | 2011/074060 A1 | | 6/2011 |

OTHER PUBLICATIONS

PCT International Search Report and Written Opinion of the International Searching Authority, International Application No. PCT/JP2012/065438, Mailing Date Aug. 7, 2012.

* cited by examiner 7-a    7-b    7-c

ONE DIRECTION  2-WAY  4-WAY  8-WAY

FOR COMPARISON

FOR COMPARISON

HEAT TREATING APPARATUS FOR POWDER PARTICLES AND METHOD OF PRODUCING TONER

TECHNICAL FIELD

The present invention relates to a heat treating apparatus for powder particles and a method of producing a toner for obtaining a toner for use in an image forming method such as an electrophotographic method, an electrostatic recording method, an electrostatic printing method, or a toner jet recording method.

BACKGROUND ART

In recent years, as image quality and precision in copiers and printers have been higher, requirements for the performance of a toner as a developer have been also even severer, and thus a toner having a smaller particle diameter and a sharper particle size distribution containing no coarse particles has been being demanded.

Further, as a transferring material for copiers and printers, there has been a need for responding to a variety of materials other than common paper, and the toner has been required to exhibit improved transferring properties. Thus, there has been a need for spheroidizing the toner particles.

However, on the other hand, if a toner is spheroidized too much, the cleaning properties of the toner are deteriorated, and thus there are also demands for controlling a degree of sphericity of the toner and for satisfying its transferring properties and cleaning properties at the same time.

With respect to such requirements, one production method in which a degree of sphericity of a toner is controlled is a method in which a surface of a toner is melted and spheroidized by a heat treatment. In the case of spheroidizing a toner by a heat treatment, there is a demand that the shape of a toner is made uniform by suppressing the coalescence of toner particles and uniformly heat-treating the particles during the heat treatment in order to satisfy the transferring properties and cleaning properties of a toner at the same time.

For achieving the above purposes, a heat treating apparatus having a turning mechanism for dispersing a powder which is a raw material and a heating mechanism that heats the dispersed powder raw material from the inside has been proposed (see, PTL 1).

However, in the case of heat-treating a toner in such an apparatus configuration, a flow current of dispersing the raw material and a flow current of heating the raw material are opposite to each other in terms of a turning direction. Therefore, if the amount of a toner to be treated is increased, the toner may be adhered to the ceiling surface and the wall surface of the apparatus by a disturbance in flow current caused in the apparatus, thereby causing a melt-adhesion product in some cases.

With regard to this, it has been proposed to blow cooling air in a slit manner from an upper portion of a side wall of a heat treating chamber in a heat treating apparatus, thereby suppressing adhesion of particles and a turbulent flow to improve productivity (see, PTL 2).

However, in the case of heat-treating a toner in such an apparatus configuration, while a flow current of dispersing a raw material and a flow current of heating a raw material are turning flows, cooling air to be introduced is perpendicular. As a result, a turbulent flow current is generated in the apparatus after all, and a heat treatment with an increased amount of a toner to be treated may cause melt-adhesion or fusion of the toner. Further, in such an apparatus configuration, since the flow current of heating a raw material is cooled by the flow current of dispersing a raw material, an excessive amount of heat must be applied for spheroidizing toner particles. Therefore, an amount of heat that the toner particles receive in the apparatus may vary, so that the toner may not be heat treated uniformly and the toner particles may not be made uniform in terms of the shape in some cases.

In this way, there is room for improvement in a heat treating apparatus for powder particles in order to satisfy transferring properties and cleaning properties of a toner at the same time by efficiently and stably producing a toner which contains no coarse particles and has a uniform shape when spheroidizing a toner by a heat treatment.

CITATION LIST

Patent Literature

PTL 1: Japanese Patent Application Laid-Open No. S62-133466
PTL 2: Japanese Patent Application Laid-Open No. S59-125742

SUMMARY OF INVENTION

Technical Problem

An object of the present invention is to provide a heat treating apparatus for powder particles and a method of producing a toner that can efficiently obtain powder particles which contain no coarse particles and have a uniform shape even if an amount of powder particles for toner to be treated is increased in spheroidizing the powder particles by a heat treatment.

Another object of the present invention is to provide a heat treating apparatus for powder particles and a method of producing a toner that can diminish fusion of powder particles in the apparatus even if an amount of powder particles for toner to be treated is increased in spheroidizing the powder particles by a heat treatment.

Solution to Problem

Namely, the present invention relates to a heat treating apparatus for powder particles each of which contains a binder resin and a colorant, the heat treating apparatus including:

(1) a cylindrical treating chamber in which a heat treatment of the powder particles is performed,
(2) a powder particle-supplying unit provided on an outer peripheral portion of the treating chamber, for supplying the powder particles to the treating chamber,
(3) a hot air-supplying unit that supplies hot air for heat-treating the supplied powder particles,
(4) a cold air-supplying unit that supplies cold air for cooling the heat-treated powder particles,
(5) a regulating unit provided on the treating chamber, for regulating a flow of the supplied powder particles, and
(6) a recovering unit provided at the lower end portion side of the treating chamber, that recovers the heat-treated powder particles, wherein
the regulating unit is a substantially circular columnar member and is arranged on the central axis of the treating chamber so as to be protruded from the lower end portion of the treating chamber toward the upper end portion of the chamber, the hot air-supplying unit has an outlet opposite to the upper end portion of the regulating member, the regulating member is equipped with a substantially conic distributing member for distributing the supplied hot air in a circumferential direction and a rotating member for rotating the distributed hot air along the inner wall surface of the treating chamber in a spiral manner, on the upper end portion of the regulating member, the powder particle-supplying unit is provided so that a direction of supplying the powder particles is the same as a direction of rotating the hot air, and the recovering unit is provided on the outer peripheral portion of the treating chamber so as to recover the powder particles while maintaining rotation of the powder particles rotating in a spiral manner.

The present invention also relates to a method of producing a toner through a heat-treating step of heat-treating powder particles containing a binder resin and a colorant by using a heat treating apparatus, wherein the heat treating apparatus with the above configuration is used as the heat treating apparatus.

Advantageous Effects of Invention

According to the present invention, powder particles for a toner which contain no coarse particles and have a uniform shape can be efficiently obtained even if the amount of powder particles for toner to be treated is increased in spheroidizing the powder particles by a heat treatment. Consequently, in the present invention, the average circularity of and the proportion of a high circularity of powder particles can be controlled at the same time, thereby enabling a toner to have satisfactory transferring properties and cleaning properties at the same time.

Further, according to the present invention, melt-adhesion or fusion of powder particles in the interior of apparatus can be diminished even if the amount of powder particles for toner to be treated is increased in spheroidizing the powder particles by a heat treatment. Consequently, in the present invention, coalescence and fusion occurring between the powder particles can be suppressed and the productivity of a toner can be enhanced.

Further features of the present invention will become apparent from the following description of exemplary embodiments with reference to the attached drawings.

DESCRIPTION OF EMBODIMENTS

In order to respond to an enhancement in transferring properties of a toner recently required, the toner may preferably have an average circularity of 0.960 or more, and more preferably 0.965 or more. On the other hand, it is also revealed that in a circularity distribution of a toner, if a frequency of particles having a circularity of 0.990 or more is increased too much, cleaning failure easily occurs.

This is because, in a cleaning method of removing a residual toner from a photosensitive member by using a cleaning member such as a blade, a nearly spherical toner easily goes through the cleaning blade. In order to prevent the toner from going through the blade, a measure of increasing a contact pressure of the cleaning blade can also be taken, but there are limitations because of adverse effects such as a rise in rotating torque of a drum and abrasion of the cleaning blade. In order to enhance cleaning properties of a toner, the content of particles having a circularity of 0.990 or more in a toner can be decreased.

Hereinafter, the present invention will be described in more detail with reference to exemplary embodiments.

A heat treating apparatus for powder particles of the present invention will be schematically described by means of FIG. 1, FIG. 2, FIG. 3, FIG. 4, and FIG. 5.

Figure 1:
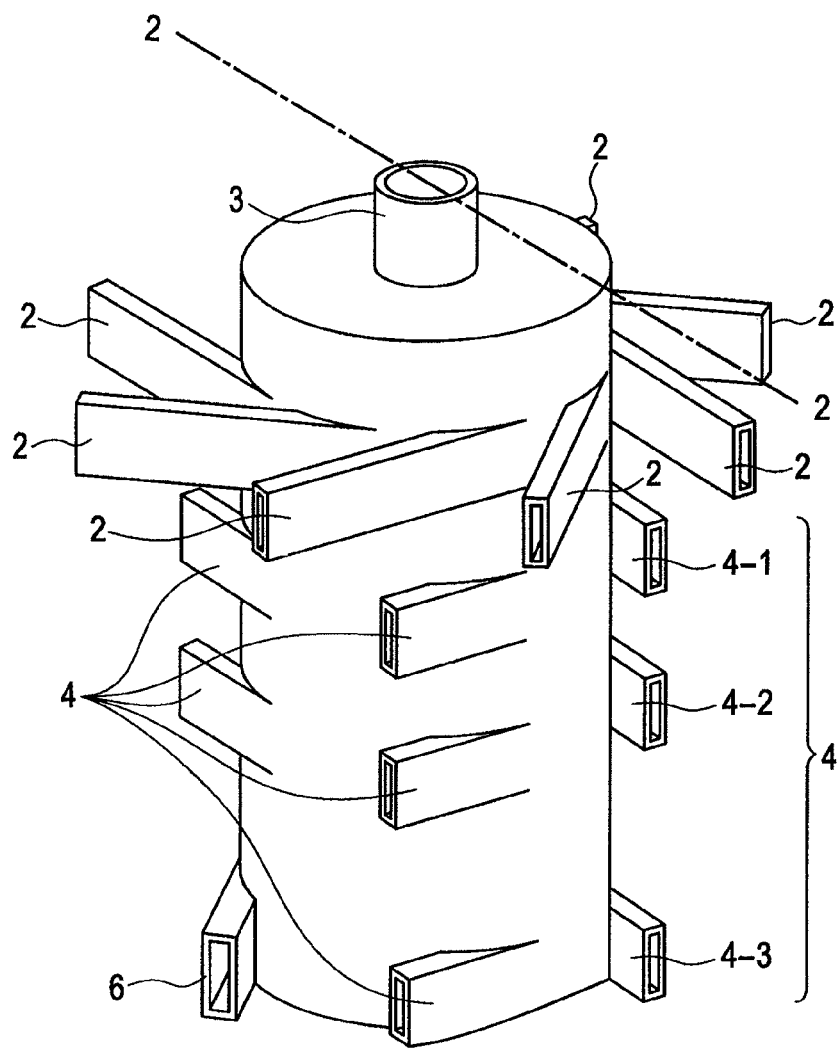
FIG. 1 is a schematic perspective view illustrating one example of a heat treating apparatus for powder particles of the present invention.
Figure 2:
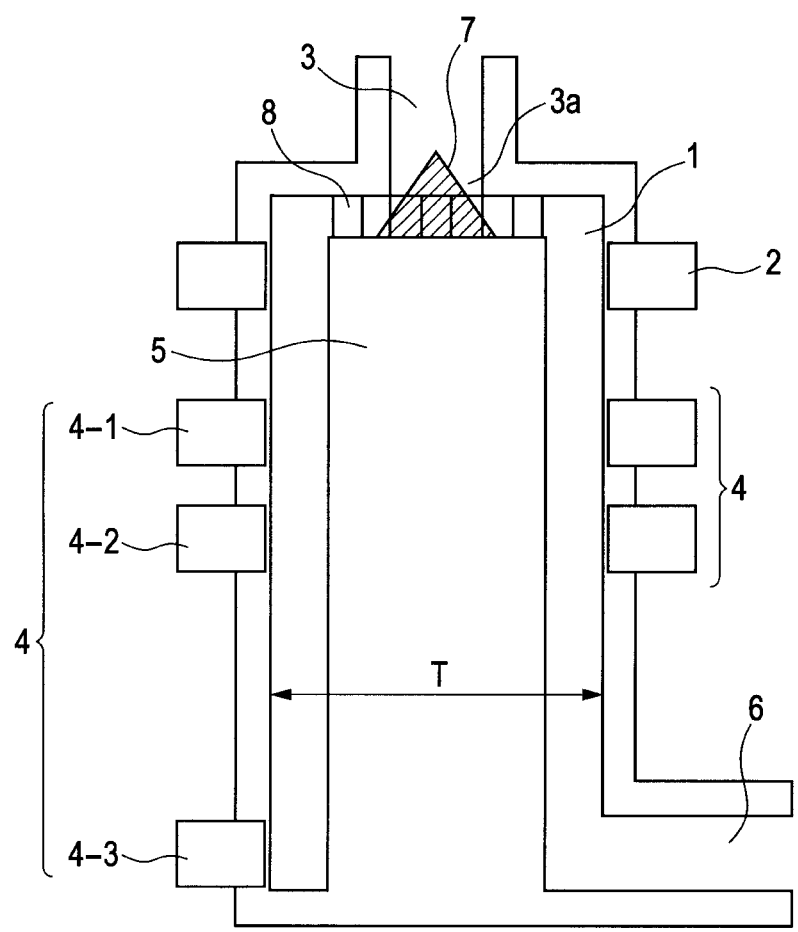
FIG. 2 is a schematic cross-sectional view of the heat treating apparatus taken along face 2-2 in FIG. 1.

As illustrated in FIG. 1 and FIG. 2, the heat treating apparatus of the present invention has a cylindrical treating chamber 1 in which a heat treatment of powder particles is performed.

An internal diameter T (mm) of the treating chamber 1 of the heat treating apparatus can be 350 mm≤T≤900 mm. If the internal diameter of the treating chamber 1 is within the above range, heat-treated particles can be efficiently produced.

The inside of the treating chamber 1 can be cooled by a cooling jacket in order to prevent fusion or melt-adhesion of the powder particles. Cooling water (that can be an antifreeze liquid such as ethylene glycol) can be introduced into the cooling jacket, and a surface temperature of the cooling jacket can be adjusted so as to be 40° C. or lower.

A powder particle-supplying unit 2 for supplying the powder particles to the treating chamber is provided on the outer peripheral portion of the treating chamber, and the powder particles are accelerated and conveyed by injection air to be supplied from a high pressure air-supplying nozzle (not illustrated), and supplied to the treating chamber.

Hot air for heat-treating the supplied powder particles is supplied from a hot air-supplying unit 3. For the hot air supplied to the treating chamber, a temperature N (° C.) at an outlet portion of the hot air-supplying unit 3 can be 100° C.≤N≤300° C. If the temperature at an outlet portion of the hot air-supplying unit is within the above range, the powder particles can be spheroidization-treated in a nearly uniform state while suppressing fusion and coalescence of the powder particles due to heating the powder particles too much.

The heat-treated powder particles are further cooled by cold air to be supplied from a cold air-supplying unit 4. A temperature R (° C.) of cold air to be supplied from the cold air-supplying unit 4 can be −20° C.≤R≤30° C. If the temperature of cold air is within the above range, the powder particles can be effectively cooled, and fusion and coalescence of the powder particles can be suppressed without inhibiting a uniform spheroidization treatment of the powder particles.

A flow of the powder particles supplied to the treating chamber is regulated by a regulating unit 5 provided in the treating chamber, for regulating the flow of the powder particles. Accordingly, the powder particles supplied to the treating chamber are heat-treated while rotating along the inner wall surface in the treating chamber in a spiral manner, and then cooled.

Then, the cooled powder particles are recovered by a recovering unit 6 at the lower end portion side of the treating chamber. Herein, the recovering unit 6 has such a configuration that a blower (not illustrated) is provided at the tip of the unit and suction by the blower allows the particles to be conveyed.

A relationship between the total flow rate of the injection air, the hot air and the cold air to be supplied into the heat treating apparatus, QIN, and an air rate to be sucked by the blower, QOUT, can be adjusted to satisfy a relationship of QIN≤QOUT. If QIN≤QOUT is satisfied, a pressure in the apparatus is a negative pressure and thus the powder particles in the treating chamber are easily discharged outside the apparatus, so that the powder particles can be suppressed so as not to receive excessive heat. As a result, increases in coalesced powder particles and fusion of the powder particles in the apparatus can be suppressed.

The regulating unit 5 for regulating the flow of the powder particles is a columnar member with a substantially circular cross-section arranged on the central axis of the treating chamber so as to be protruded from the lower end portion of the treating chamber toward the upper end portion of the chamber. The regulating unit 5 for regulating the flow of the powder particles is located on the central axis of the treating chamber, so that the powder particles supplied to the treating chamber flow in the cylindrical treating chamber while rotating in a spiral manner.

Figure 3:
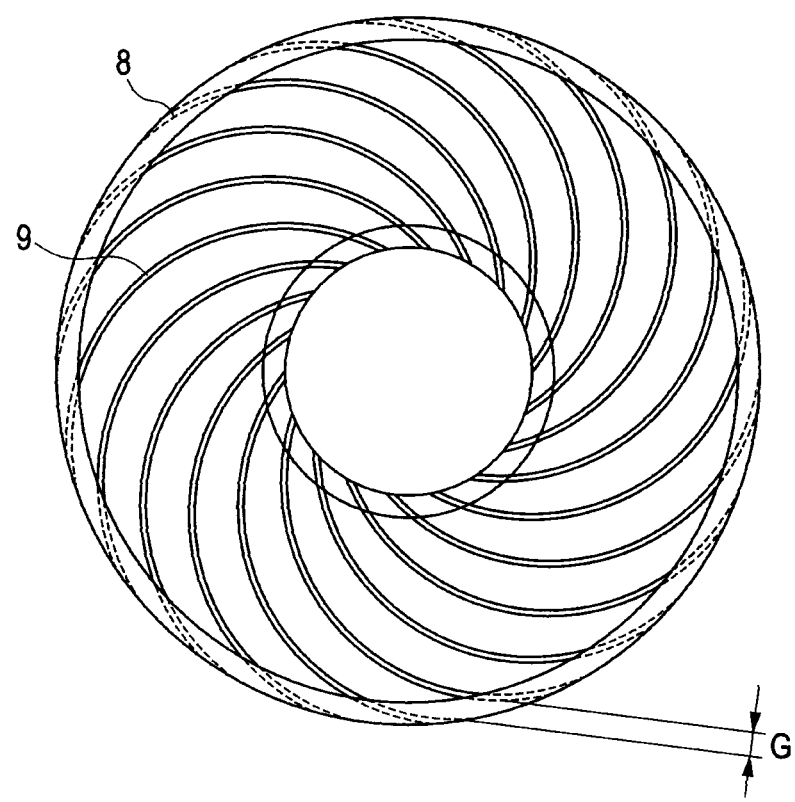
FIG. 3 is one example of a rotating member to be used for the heat treating apparatus of the present invention, for rotating hot air in a spiral manner.

An outlet 3a of the hot air-supplying unit of the heat treating apparatus of the present invention is opposite to the upper end portion of the columnar member (regulating unit 5). The columnar member is equipped with a substantially conic distributing member 7 for distributing the supplied hot air in a circumferential direction, on the central portion of the upper end portion of the member. The columnar member is further equipped with a rotating member 8, as illustrated in FIG. 3, for rotating the distributed hot air in the treating chamber in a spiral manner. The columnar member is equipped with the distributing member 7 and the rotating member 8 on the upper end portion of the member to thereby make dispersion of the powder particles supplied into the treating chamber favorable. In contrast, in the case where the upper end portion of the columnar member is apart from the distributing member 7 and the rotating member 8, rotation of the hot air is easily disordered, the powder particles are not sufficiently dispersed, and coalescence of the powder particles and fusion of the particles in the apparatus easily occur.

The hot air-supplying unit of the heat treating apparatus of the present invention has the configuration, and thus the hot air supplied from the hot air-supplying unit flows while rotating along the inner wall surface of the cylindrical treating chamber in a spiral manner.

Thus, the powder particles supplied to the inside of the treating chamber are heat-treated while receiving a centrifugal force due to a rotational flow. As a result, collision between the powder particles is decreased and coalescence of the powder particles at the time of the heat treatment is reduced, thereby enabling obtaining a toner having a uniform shape.

The rotating member 8 for rotating hot air may have such a configuration that enables supplying hot air so as to rotate the hot air along the inner wall surface in the treating chamber in a spiral manner. According to such a configuration, the rotating member 8 for rotating hot air has a plurality of blades 9, as illustrated in FIG. 3, and rotation of hot air can be controlled depending on the number and angle of the blades. As illustrated in FIG. 3, since hot air is introduced from a gap between the plurality of blades 9 in a spiral manner, as the number of the blades is larger, the gap G (mm) between the blades is narrower and the flow velocity of the hot air to be supplied is higher. For example, in the case where the internal diameter of the treating chamber is 450 mm, the gap G (mm) between the blades can be 5 mm≤G≤40 mm.

Herein, the columnar member can be provided with a cooling jacket in order to prevent fusion of the powder particles. Further, cooling water (that can be an antifreeze liquid such as ethylene glycol) can be introduced into the cooling jacket, and a surface temperature of the cooling jacket can be 40° C. or lower.

Figure 4:
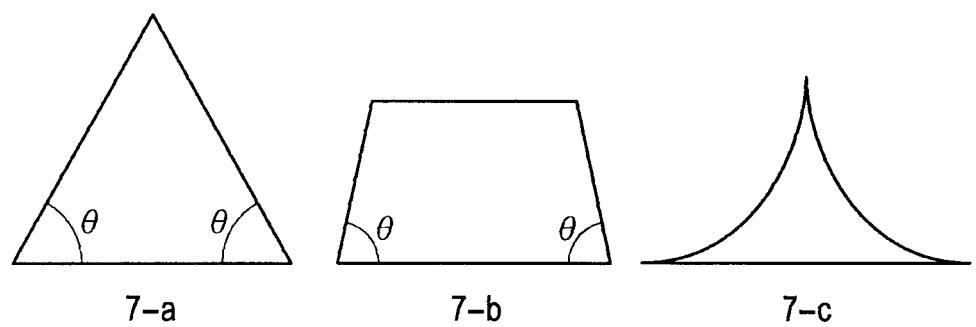
FIG. 4 is a schematic cross-sectional view of a substantially conic hot air-distributing member.

A substantially conic distributing member can be provided on an outlet portion of the hot air-supplying unit 3. As illustrated in FIG. 4, a cross-section of the distributing member in a vertical direction of the heat treating apparatus may expand from upstream toward downstream, and the cross-section may be a triangular shape as illustrated in 7-a or may be a trapezoid shape as illustrated in 7-b. The cross-section may also be a shape illustrated in 7-c of FIG. 4, but hot air can be more uniformly distributed when the cross-section in a vertical direction of the heat treating apparatus is a triangular shape. Herein, angles at bases illustrated in 7-a and 7-b of FIG. 4, θ°, are preferably 5°≤θ≤85°, and more preferably 30°≤θ≤75°.

The powder particle-supplying unit 2 can be provided such that a direction of rotating the supplied powder particles is the same as a direction of rotating hot air.

The direction of rotating the powder particles supplied to the treating chamber is the same as the direction of rotating hot air, so that a turbulent flow does not occur in the treating chamber. Therefore, collision between the powder particles is decreased and coalescence of the powder particles at the time of the heat treatment is decreased, thereby enabling a toner having a uniform shape to be produced.

Further, the flow of the powder particles supplied to the treating chamber has the same direction as the turning flow of the hot air, so that a centrifugal force which the powder particles receive at the time of the heat treatment is increased to thereby highly disperse the powder particles in the treating chamber. As a result, even if a dust concentration in the treating chamber is increased, collision between the powder particles hardly occurs, thereby enabling increasing an amount of the powder particles to be treated.

The recovering unit 6 is provided on the outer peripheral portion of the treating chamber so as to recover the powder particles while maintaining the direction of rotating the powder particles.

Thus, a rotational flow of the powder particles in the treating chamber can be maintained, the centrifugal force to be applied to the powder particles is maintained, and adhesion and fusion of the powder particles to the regulating unit 5 are diminished. Herein, at least one powder particle-recovering unit may be provided at the lowest end in the apparatus in a direction of maintaining rotation of the powder particles, and a plurality of powder particle-recovering units may also be provided.

The regulating unit 5 for regulating the flow of the powder particles may be a columnar member with a substantially circular cross-section in a horizontal direction of the heat treating apparatus, and a diameter of the columnar member can be larger toward downstream of the treating chamber. Thus, a flow velocity of the powder particles at an end portion at the powder particle-recovering unit side is higher, and discharging properties of the powder particles can be enhanced and also adhesion, fusion and coalescence of the powder particles at a recovering part can be prevented.

A percentage of the regulating unit 5 accounting for the treating chamber, V (% by volume), can be 5% by volume≤V≤60% by volume. The above range enables controlling the flow velocity of the powder particles in the treating chamber, and it is considered that dispersibility and discharging properties of the powder particles are enhanced.

A plurality of the cold air-supplying units 4 can be provided on the outer peripheral portion of the treating chamber and each unit can be provided so that the cold air supplied from the cold air-supplying unit is supplied along the inner peripheral surface of the treating chamber in the same direction as the direction of rotating hot air.

The cold air to be supplied from the cold air-supplying unit can be supplied from the outer peripheral portion of the apparatus to the inner peripheral surface of the treating chamber in horizontal and tangential directions, and thus adhesion of the powder particles to the wall surface of the treating chamber can be suppressed.

In addition, a direction of rotating the cold air to be supplied from the cold air-supplying unit is the same as the direction of rotating hot air, so that a turbulent flow does not occur in the treating chamber, thereby enabling suppressing coalescence of the powder particles.

Each cold air to be supplied is preferably introduced in multiple ways and more preferably introduced in 4 ways, in a horizontal cross-section of the apparatus. This is made for easily controlling a flow of air in the apparatus uniformly, and an air rate of each cold air in introduction paths in 4 ways can be independently controlled. Thus, the rotational flow in the apparatus is further made stronger, so that a strong centrifugal force is applied to the powder particles to improve dispersibility of the powder particles.

The powder particles to be supplied from the powder particle-supplying unit 2 can be supplied from the outer peripheral portion of the apparatus to the inner peripheral surface of the treating chamber in horizontal and tangential directions. According to such a configuration, a strong centrifugal force is applied to the powder particles supplied into the treating chamber to improve dispersibility of the powder particles.

In the heat treating apparatus, all of the direction of rotating the powder particles to be supplied from the powder particle-supplying unit, the direction of rotating the cold air supplied from the cold air-supplying unit, and the direction of rotating the hot air supplied from the hot air-supplying unit can be the same direction. Thus, a turbulent flow hardly occurs in the treating chamber, a rotational flow in the apparatus is stronger, a strong centrifugal force is applied to the powder particles, and dispersibility of the powder particles is further enhanced. Consequently, a toner with less coalesced particles and a uniform shape can be obtained.

Figure 5:
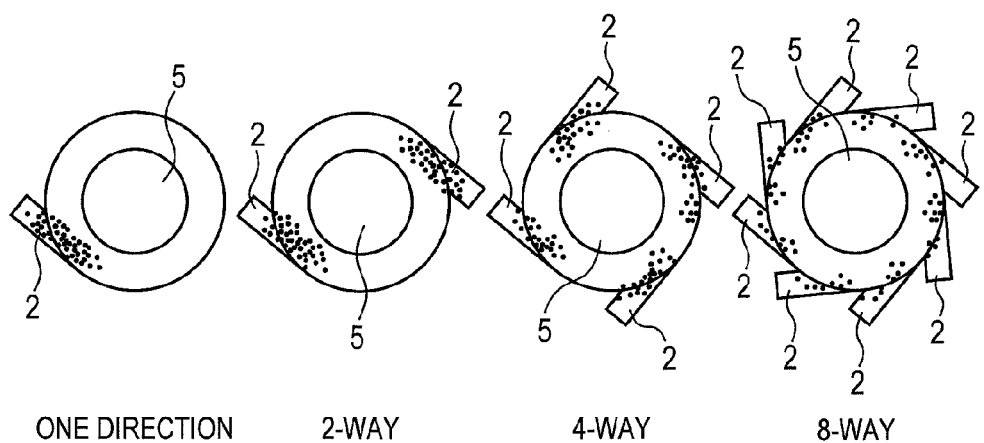
FIG. 5 is a schematic cross-sectional view of a powder particle-supplying unit.

A plurality of the powder particle-supplying units may preferably be provided in the same circumferential direction. As illustrated in FIG. 5, as the number of ways in the powder particle-supplying unit is larger, the powder particles immediately after being introduced into the treating chamber are subjected to the heat treatment with a dust concentration being reduced. Thus, as the number of ways in the powder particle-supplying unit is larger, a temperature required for the heat treatment can be reduced. That is, at the same temperature, as the number of ways in the powder particle-supplying unit is larger, an average circularity of the powder particles after the heat treatment is higher.

If the powder particle-supplying unit is present in multiple ways, a dust concentration per powder particle-supplying unit is reduced as the number of ways is larger, in the case where the amount of the powder particles to be treated is not changed. Thus, if the amount to be treated is increased under the same condition, a dust concentration of the powder particles to be introduced into the treating chamber is reduced as the number of ways in the powder particle-supplying unit is larger. Therefore, even if the amount of the powder particles to be treated is increased, powder particles with less coalesced particles and a uniform shape can be obtained.

Herein, for example, in the case where the internal diameter of the treating chamber is 450 mm, the powder particles are introduced in preferably 4 to 12 ways, and more preferably 8 ways. If the powder particle-supplying unit is present in 8 ways, coalescence of the powder particles at the time of the heat treatment of the powder particles can be suppressed even if the amount of the powder particles to be treated is increased.

A plurality of the cold air-supplying units can be provided at the downstream side of the powder particle-supplying unit. Each cold air-supplying unit is located at the downstream side of the powder particle-supplying unit, thereby not cooling a heat treatment zone in the treating chamber by the introduced cold air to prevent a heat-treatment temperature required for spheroidization of the powder particles from rising.

An air rate and temperature of the introduced cold air can be independently controlled. Thus, as illustrated in FIG. 1, the cold air-supplying unit can be provided in a three-stage manner. Thus, the introduced cold air can be separated into cold air in the first stage (4-1), which is cold air having a function of efficiently sending the powder particles introduced into the treating chamber to a heat treatment zone; cold air in the second stage (4-2), which is cold air having a function of cooling the powder particles; and cold air in the third stage (4-3), which is cold air having a function of cooling the powder particle-recovering unit. Herein, in the case where cold air is introduced in a two-stage manner, a combination of two of the three functions of the cold air may be arbitrarily selected.

In a method of producing a toner by using the heat treating apparatus of the present invention, an air velocity of the hot air to be introduced from the rotating member of the hot air-supplying unit to the treating chamber, Vh (m/s), can be equal to or more than a supply velocity of the powder introduced from the powder particle-supplying unit to the treating chamber, Vt (m/s).

The air velocity of the hot air, Vh (m/s), is equal to or more than the supply velocity of the powder particles, Vt (m/s), so that a shear force due to flow currents in the treating chamber is generated and thus the powder particles are heat-treated with being more highly dispersed. In addition, since a velocity of the hot air supplied from the rotating chamber for rotating the hot air into the treating chamber is higher than a supply velocity of a toner, adhesion of the powder particles to the rotating member can be suppressed. Thus, even if heat is accumulated in the rotating member by the hot air to raise a temperature of the member, the powder particles can be stably produced without being fused.

In the case where the internal diameter of the treating chamber is 450 mm, the air velocity of the hot air introduced from the rotating member of the hot air-supplying unit to the treating chamber, Vh (m/s), can be 25 m/s≤Vh≤85 m/s. If the flow velocity of the hot air is within the above range, a shear force to be given to the powder particles is enhanced, so that the powder particles are heat-treated with being more dispersed.

The heat treating apparatus of the present invention can be applied to powder particles obtained by a known production method such as a pulverizing method, a suspension polymerization method, an emulsion aggregation method, or a dissolution suspension method. Hereinafter, a procedure of producing a toner by a pulverizing method will be described.

First, in a raw material-mixing step, at least a resin and a colorant are weighed in predetermined amounts and blended as toner raw materials, and mixed. One example of a mixing apparatus includes Henschel Mixer (manufactured by NIPPON COKE & ENGINEERING CO., LTD.); Super Mixer (Manufactured by KAWATA MFG Co., Ltd.); Ribocone (manufactured by OKAWARA MFG. Co., Ltd.); Nauta Mixer, Turbulizer, and Cyclomix (manufactured by Hosokawa Micron Corporation); Spiral Pin Mixer (manufactured by Pacific Machinery & Engineering Co., Ltd.); and Loedige Mixer (manufactured by Matsubo Corporation).

Further, the mixed toner raw materials are melted and kneaded in a melting and kneading step to melt resins and to disperse a colorant and the like therein. One example of a kneading apparatus includes a TEM extruder (manufactured by Toshiba Machine Co., Ltd.); a TEX twin-screw kneader (manufactured by The Japan Steel Works, LTD.); a PCM kneader (manufactured by Ikegai, Corp.); and KNEADEX (manufactured by NIPPON COKE & ENGINEERING CO., LTD.), and a continuous-type kneader such as a single- or twin-screw extruder is more preferable than a batch-type kneader from the viewpoint of advantages such as a capability of continuous production.

Further, a colored resin composition obtained by melting and kneading the toner raw materials is melted and kneaded, rolled by a two-roller or the like, and then cooled through a cooling step of cooling with water-cooling.

The cooled product of the colored resin composition, obtained as described above, is then pulverized so as to have a desired particle diameter in a pulverizing step. In the pulverizing step, the product is roughly pulverized by a crusher, a hammer mill, a feather mill or the like, and further finely pulverized by Kryptron System (manufactured by Kawasaki Heavy Industries, Ltd.), Super Rotor (manufactured by Nisshin Engineering Inc.) or the like to obtain toner fine particles.

The obtained toner fine particles are classified into powder particles for toner having a desired particle diameter in a classification step. A classifier includes Turboplex, Faculty, a TSP separator and a TTSP separator (manufactured by Hosokawa Micron Corporation); and ELBOW-JET (manufactured by Nittetsu Mining Co., Ltd.).

Subsequently, as a heat treatment step, the obtained powder particles for toner are spheroidization-treated by using the heat treating apparatus of the present invention.

Before the heat treatment step, inorganic fine particles or the like may be added, as required, to the powder particles. As a method of adding the inorganic fine particles or the like to the powder particles, there is a method in which the powder particles and a variety of known external additives are blended in predetermined amounts, and stirred and mixed by using as an external adding machine a high speed stirrer giving a shear force to a powder, such as Henschel Mixer, MECHANO HYBRID (manufactured by NIPPON COKE & ENGINEERING CO., LTD.), and Super Mixer and NOBILTA (manufactured by Hosokawa Micron Corporation).

The inorganic fine powders are added to the powder particles to thereby give fluidity to the powder particles, so that the powder particles introduced into the treating chamber of the heat treating apparatus are more uniformly dispersed to enable being in contact with hot air and to enable obtaining a toner heat-treated in a nearly uniform state.

In the case where coarse particles are present after the heat treatment, a step of removing the coarse particles by classification may be performed as required. A classifier that removes the coarse particles includes Turboplex, a TSP separator and a TTSP separator (manufactured by Hosokawa Micron Corporation); and ELBOW-JET (manufactured by Nittetsu Mining Co., Ltd.).

Further, after the heat treatment, in order to sieve the coarse particles or the like, a sieving machine such as ULTRASONIC (manufactured by Koei Sangyo Co., Ltd.); Resona Sieve and Gyro Sifter (manufactured by Tokuju Corporation); Turbo Screener (manufactured by Turbo Kogyo Co., Ltd.); and HI-BOLTER (manufactured by TOYO HITEC CO., LTD.) may be used as required.

Herein, the heat treatment step may be performed after the above finely pulverizing or may be performed after the classification.

Then, a material to be used for a toner will be described.

As a binder resin, a known resin is used, and examples include homopolymers of a styrene derivative, such as polystyrene and polyvinyl toluene; styrene-type copolymers such as a styrene-propylene copolymer, a styrene-vinyl toluene copolymer, styrene-vinylnaphthalene copolymer, a styrene-methyl acrylate copolymer, a styrene-ethyl acrylate copolymer, a styrene-butyl acrylate copolymer, a styrene-octyl acrylate copolymer, a styrene-dimethylaminoethyl acrylate copolymer, a styrene-methyl methacrylate copolymer, a styrene-ethyl methacrylate copolymer, a styrene-butyl methacrylate copolymer, a styrene-octyl methacrylate copolymer, a styrene-dimethylaminoethyl methacrylate copolymer, a styrene-vinylmethylether copolymer, a styrene-vinylethylether copolymer, a styrene-vinylmethylketone copolymer, a styrene-butadiene copolymer, a styrene-isoprene copolymer, a styrene-maleic acid copolymer, and a styrene-maleate copolymer; polymethyl methacrylate, polybutyl methacrylate, polyvinyl acetate, polyethylene, polypropylene, polyvinylbutyral, a silicone resin, a polyester resin, a polyamide resin, an epoxy resin, a polyacrylic resin, rosin, modified rosin, a terpene resin, a phenol resin, an aliphatic or alicyclic hydrocarbon resin, and an aromatic petroleum resin, and these resins may be used alone or mixed.

In particular, a polymer that can be used as the binder resin is a polyester resin or a hybrid resin having a styrene-type copolymerizable unit and a polyester unit.

Examples of a polymerizable monomer to be used for the styrene-type copolymer include the following: styrene; styrene and derivatives thereof such as o-methylstyrene, m-methylstyrene, p-methylstyrene, α-methylstyrene, p-phenylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, p-chlorostyrene, 3,4-dichlorostyrene, m-nitrostyrene, o-nitrostyrene, and p-nitrostyrene; unsaturated monoolefins such as ethylene, propylene, butylene, and isobutylene; unsaturated polyenes such as butadiene and isoprene; vinyl halides such as vinyl chloride, vinylidene chloride, vinyl bromide, and vinyl fluoride; vinyl esters such as vinyl acetate, vinyl propionate, and vinyl benzoate; α-methylene aliphatic monocarboxylates such as methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate, and diethylaminoethyl methacrylate; acrylates such as methyl acrylate, ethyl acrylate, propyl acrylate, n-butyl acrylate, isobutyl acrylate, n-octyl acrylate, dodecyl acrylate, 2-ethylhexyl acrylate, stearyl acrylate, 2-chloroethyl acrylate, and phenyl acrylate; vinylethers such as vinylmethylether, vinylethylether, and vinylisobutylether; vinylketones such as vinylmethylketone, vinylhexylketone, and methylisopropenylketone; N-vinyl compounds such as N-vinylpyrrole, N-vinylcarbazole, N-vinylindole, and N-vinylpyrrolidone; vinylnaphthalenes; and acrylate or methacrylate derivatives such as acrylonitrile, methacrylonitrile, and acrylamide.

Further, the monomer includes unsaturated dibasic acids such as maleic acid, citraconic acid, itaconic acid, alkenylsuccinic acid, fumaric acid, and mesaconic acid; unsaturated dibasic acid anhydrides such as maleic anhydride, citraconic anhydride, itaconic anhydride, and an alkenylsuccinic anhydride; unsaturated dibasic acid half esters such as maleic acid methyl half ester, maleic acid ethyl half ester, maleic acid butyl half ester, citraconic acid methyl half ester, citraconic acid ethyl half ester, citraconic acid butyl half ester, itaconic acid methyl half ester, alkenylsuccinic acid methyl half ester, fumaric acid methyl half ester, and mesaconic acid methyl half ester; unsaturated dibasic acid esters such as dimethyl maleate and dimethyl fumarate; α,β-unsaturated acid such as acrylic acid, methacrylic acid, crotonic acid, and cinnamic acid; α,β-unsaturated acid anhydrides such as crotonic anhydride and cinnamic anhydride, and anhydrides of the α,β-unsaturated acids and lower fatty acids; and monomers each having a carboxyl group such as an alkenylmalonic acid, an alkenylglutaric acid, and an alkenyladipic acid, and anhydrides and monoesters of these acids.

Further, the monomer includes acrylates or methacrylates such as 2-hydroxyethyl acrylate, 2-hydroxyethyl methacrylate, and 2-hydroxypropyl methacrylate; and monomers each having a hydroxy group such as 4-(1-hydroxy-1-methylbutyl)styrene and 4-(1-hydroxy-1-methylhexyl)styrene.

The "polyester unit" means a moiety derived from polyester, and a component constituting the polyester unit includes an alcohol component and an acid component. The alcohol component includes a dihydric or more alcohol component, and the acid component includes divalent or more carboxylic acid, divalent or more carboxylic anhydride, and divalent or more carboxylate.

The dihydric alcohol monomer component includes alkylene oxide adducts of bisphenol A, such as polyoxypropylene(2.2)-2,2-bis(4-hydroxyphenyl)propane, polyoxypropylene(3.3)-2,2-bis(4-hydroxyphenyl)propane, polyoxyethylene(2.0)-2,2-bis(4-hydroxyphenyl)propane, polyoxypropylene(2.0)-polyoxyethylene(2.0)-2,2-bis(4-hydroxyphenyl)propane, and polyoxypropylene(6)-2,2-bis(4-hydroxyphenyl)propane; ethylene glycol, diethylene glycol, triethylene glycol, 1,2-propylene glycol, 1,3-propylene glycol, 1,4-butanediol, neopentyl glycol, 1,4-butenediol, 1,5-pentanediol, 1,6-hexanediol, 1,4-cyclohexane dimethanol, dipropylene glycol, polyethylene glycol, polypropylene glycol, polytetramethylene glycol, bisphenol A, and hydrogenated bisphenol A.

The trihydric or more alcohol monomer component includes sorbit, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methyl propanetriol, 2-methyl-1,2,4-butanetriol, trimethylol ethane, trimethylol propane, and 1,3,5-trihydroxyethyl benzene.

The divalent carboxylic acid monomer component includes aromatic dicarboxylic acids or anhydrides thereof, such as phthalic acid, isophthalic acid, and terephthalic acid; alkyldicarboxylic acids or anhydrides thereof such as succinic acid, adipic acid, sebacic acid, and azelaic acid; succinic acids substituted with an alkyl group or alkenyl group having 6 to 17 carbon atoms, or anhydrides thereof; and unsaturated dicarboxylic acids or anhydrides thereof such as fumaric acid, maleic acid, and citraconic acid.

The trivalent or more carboxylic acid monomer component includes polyvalent carboxylic acids such as trimellitic acid, pyromellitic acid, benzophenone tetracarboxylic acid, and anhydrides thereof.

In addition, other monomers include polyhydric alcohols such as oxyalkylether of a novolac phenol resin.

A colorant includes the following.

A black colorant includes carbon black; magnetic material; and a colorant toned in black by using a yellow colorant, a magenta colorant and a cyan colorant.

A coloring pigment for a magenta toner includes the following: a condensed azo compound, a diketopyrrolopyrrole compound, anthraquinone, a quinacridone compound, a base dye lake compound, a naphthol compound, a benzimidazolone compound, a thioindigo compound, and a perylene compound. Specifically, the pigment includes C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 144, 146, 150, 163, 166, 169, 177, 184, 185, 202, 206, 207, 209, 220, 221, 238, 254, 269; C.I. Pigment Violet 19, and C.I. Vat Red 1, 2, 10, 13, 15, 23, 29, 35.

For the colorant, a pigment may be used alone, but a dye and a pigment can be used in combination from the viewpoint of an image quality of a full color with improved sharpness.

A dye for a magenta toner includes the following: oil soluble dyes such as C.I. Solvent Red 1, 3, 8, 23, 24, 25, 27, 30, 49, 81, 82, 83, 84, 100, 109, 121, C.I. Disperse Red 9, C.I. Solvent Violet 8, 13, 14, 21, 27, and C.I. Disperse Violet 1, and basic dyes such as C.I. Basic Red 1, 2, 9, 12, 13, 14, 15, 17, 18, 22, 23, 24, 27, 29, 32, 34, 35, 36, 37, 38, 39, 40, and C.I. Basic Violet 1, 3, 7, 10, 14, 15, 21, 25, 26, 27, 28.

A coloring pigment for a cyan toner includes the following: C.I. Pigment Blue 1, 2, 3, 7, 15:2, 15:3, 15:4, 16, 17, 60, 62, 66; C.I. Vat Blue 6, C.I. Acid Blue 45, and a copper phthalocyanine pigment in which 1 to 5 phthalimidomethyl groups are substituted with a phthalocyanine skeleton.

A coloring pigment for yellow includes the following: a condensed azo compound, an isoindoline compound, an anthraquinone compound, an azo metal compound, a methine compound, and an allylamide compound. Specifically, the pigment includes C.I. Pigment Yellow 1, 2, 3, 4, 5, 6, 7, 10, 11, 12, 13, 14, 15, 16, 17, 23, 62, 65, 73, 74, 83, 93, 95, 97, 109, 110, 111, 120, 127, 128, 129, 147, 155, 168, 174, 180, 181, 185, 191; and C.I. Vat Yellow 1, 3, 20. A dye such as C.I. Direct Green 6, C.I. Basic Green 4, C.I. Basic Green 6, or Solvent Yellow 162 can also be used.

In the toner, the colorant is mixed with the binder resin in advance to form a master batch, which can be used. Then, this colorant master batch and other raw materials (such as binder resin and wax) are melted and kneaded, thereby enabling favorable dispersion of the colorant in the toner.

In the case where the colorant is mixed with the binder resin to form a master batch, dispersibility of the colorant does not deteriorate even if a large amount of the colorant is used, and dispersibility of the colorant in the toner particles is improved and color reproducibility such as mixing properties and clarity is excellent. A toner with a high covering power on a transferring material can also be obtained. In addition, the improvement in dispersibility of the colorant enables obtaining an image which is excellent in duration stability of toner chargeability and which maintains a high image quality.

In the production of a toner, the powder particles can be mixed with a fluidizer, a transferring aid, a charge stabilizer or the like by a mixing machine such as Henschel Mixer before the heat treatment step and be used.

As the fluidizer, any fluidizer can be used as long as fluidity can be increased after adding the fluidizer, as compared with fluidity before adding the fluidizer. For example, fluorine resin powders such as a vinylidene fluoride fine powder and a polytetrafluoroethylene fine powder; silica fine powders such as a titanium oxide fine powder, an alumina fine powder, silica obtained by a wet process, and silica obtained by a dry process; and treated silica obtained by subjecting the surface of the above silica to a surface treatment by a silane compound, an organic silicon compound, a titanium coupling agent, or silicone oil can be used.

As the titanium oxide fine powder, titanium oxide fine particles obtained by low temperature oxidation (thermal decomposition and hydrolysis) of titanium alkoxide, titanium halide, or titanium acetylacetonate are used. As a crystal system, any of crystal systems including an anatase type, a rutile type, a mixed crystal of them, and an amorphous type can also be used.

As the alumina fine powder, an alumina fine powder obtained by a Bayer method, an improved Bayer method, an ethylene chlorohydrin method, a submerged spark discharge method, an organic aluminum hydrolysis method, an aluminum alum thermal decomposition method, an ammonium aluminum carbonate thermal decomposition method, or a flame decomposition method for aluminum chloride is used. As the crystal system, any of crystal systems including $\alpha$, $\beta$, $\gamma$, $\delta$, $\xi$, $\eta$, $\theta$, $\kappa$, $\chi$, and $\rho$ types, a mixed crystal of them, and an amorphous type is used, and an $\alpha$, $\delta$, $\gamma$, or $\theta$ type, a mixed crystal of them, or an amorphous type can be used.

The surface of the fine powder can be hydrophobized with a coupling agent or silicone oil.

A method of hydrophobizing the surface of the fine powder is a method of chemically or physically treating the fine powder with an organosilicon compound or the like which reacts with or physically adsorbs to the fine powder.

A preferred method as the hydrophobizing method is a method of treating silica fine particles produced by vapor phase oxidation of a silicon-halogen compound with an organosilicon compound. Examples of the organosilicon compound to be used for such a method include the following: hexamethyldisilazane, trimethylsilane, trimethylchlorosilane, trimethylethoxysilane, dimethyldichlorosilane, methyltrichlorosilane, allyldimethylchlorosilane, allylphenyldichlorosilane, benzyldimethylchlorosilane, bromomethyldimethylchlorosilane, $\alpha$-chloroethyltrichlorosilane, $\beta$-chloroethyltrichlorosilane, chloromethyldimethylchlorosilane, triorganosilylmercaptan, trimethylsilylmercaptan, triorganosilyl acrylate, vinyldimethylacetoxysilane, dimethylethoxysilane, dimethyldimethoxysilane, diphenyldiethoxysilane, hexamethyldisiloxane, 1,3-divinyltetramethyldisiloxane, 1,3-diphenyltetramethyldisiloxane, and dimethylpolysiloxane having 2 to 12 siloxane units per molecule and containing hydroxyl groups each bound to one Si on the unit positioned at the terminal.

The fluidizer may be used alone or may be used in combination of multiple fluidizers.

The fluidizer is used in an amount of preferably 0.1 to 8.0 parts by mass, and more preferably 0.1 to 4.0 parts by mass, based on 100 parts by mass of the powder particles.

Herein, the above additive may be used as an external additive in an external addition step.

Measurement methods of a variety of physical properties will be described below.

<Measurement Method of Weight Average Particle Diameter (D4)>

Weight average particle diameters (D4) of powder particles and a toner are calculated as follows. As a measurement apparatus, a precise particle size distribution measurement apparatus "Coulter Counter Multisizer 3" (registered trademark, manufactured by Beckman Coulter, Inc.) equipped with a 100 μm aperture tube by a pore electric resistance method is used. Regarding setting of measurement conditions and analysis of measurement data, an attached dedicated software "Beckman Coulter Multisizer 3 Version 3.51" (manufactured by Beckman Coulter, Inc.) is used. Herein, the measurement is performed with the number of effective measurement channels of 25,000 channels.

As an electrolytic aqueous solution to be used for the measurement, a solution prepared by dissolving special grade sodium chloride in ion-exchange water in such a way as to have a concentration of about 1% by mass, for example, "ISOTON II" (produced by Beckman Coulter, Inc.), can be used.

Herein, prior to the measurement and the analysis, the dedicated software is set as described below.

In the screen of "Modification of the standard operating method (SOM)" of the dedicated software, the total count number in the control mode is set at 50,000 particles, the number of measurements is set at 1 time, and the Kd value is set at a value obtained by using "Standard particles 10.0 μm" (produced by Beckman Coulter, Inc.). The threshold value and the noise level are automatically set by pressing "Threshold value/noise level measurement button". The current is set at 1,600 μA, the gain is set at 2, the electrolytic solution is set at ISOTON II, and a check mark is placed in "Post-measurement aperture tube flush".

In the screen of "Setting of conversion from pulses to particle diameter" of the dedicated software, the bin interval is set at a logarithmic particle diameter, the particle diameter bin is set at 256 particle diameter bins, and the particle diameter range is set at 2 μm to 60 μm.

The specific measurement process is as described below.

(1) About 200 ml of the electrolytic aqueous solution is charged in a 250 ml round-bottom glass beaker dedicated to Multisizer 3, the beaker is set in a sample stand, and counterclockwise stirring is performed with a stirrer rod at 24 revolutions/sec. Then, contamination and air bubbles in the aperture tube are removed by "Aperture flush" function of the dedicated software.

(2) About 30 ml of the electrolytic aqueous solution is charged in a 100 ml flat-bottom glass beaker. A diluted solution is prepared by diluting "Contaminon N" (a 10% by mass aqueous solution of a neutral detergent for washing a precision measuring device, including a nonionic surfactant, an anionic surfactant and an organic builder, and having a pH of 7, produced by Wako Pure Chemical Industries, Ltd.) with ion-exchange water by a factor of about 3 on a mass basis, and about 0.3 ml of the diluted solution is added into the beaker as a dispersing agent.

(3) An ultrasonic dispersion device "Ultrasonic Dispersion System Tetora 150" (manufactured by Nikkaki Bios Co., Ltd.) is prepared, the device incorporating two oscillators with an oscillatory frequency of 50 kHz so that the phases are displaced by 180 degrees and having an electrical output of 120 W. Then, about 3.3 l of ion-exchange water is charged into a water tank of the ultrasonic dispersion device, and about 2 ml of Contaminon N is added into this water tank.

(4) The beaker in the (2) is set in a beaker fixing hole of the above ultrasonic dispersion system, and the ultrasonic dispersion device is actuated. The height position of the beaker is adjusted so that the resonance state of the liquid surface of the electrolytic aqueous solution in the beaker is maximized.

(5) While the electrolytic aqueous solution in the beaker of the (4) is irradiated with an ultrasonic wave, about 10 mg of a toner is added to the electrolytic aqueous solution little by little and is dispersed. Subsequently, an ultrasonic dispersion treatment is further continued for 60 seconds. Herein, in the ultrasonic dispersion, the water temperature of the water tank is appropriately controlled so as to be 10° C. or higher and 40° C. or lower.

(6) The electrolytic aqueous solution, in which the toner is dispersed, of the item (5) is dropped to the round-bottom beaker of the (1) set in the sample stand by using a pipette so that the measurement concentration is adjusted to be about 5%. Then, the measurement is performed until the number of measured particles reaches 50,000.

(7) The measurement data is analyzed by the dedicated software attached to the apparatus, and the weight average particle diameter (D4) is calculated. Herein, when Graph/% by volume is set in the dedicated software, "Average diameter" on the screen of "Analysis/statistical value on volume (arithmetic average)" is the weight average particle diameter (D4).

<Calculating Method for Amount of Fine Powder>

An amount (% by number) of fine powder on the number basis in the powder particles or the toner is calculated by analyzing data after the measurement with Multisizer 3.

For example, % by number of particles of 4.0 µm or less in the toner is calculated by the following procedure. First, the chart of the measurement results is displayed in terms of % by number by setting the dedicated software to "Graph/% by number". Then, a check mark is placed in "<" of the particle diameter-setting portion on the screen of "Format/particle diameter/particle diameter statistics", and "4" is input in the particle diameter-inputting portion below the particle diameter-setting portion. The numerical value in the display portion of "<4 µm" when the screen of "Analysis/statistical value on number (arithmetic average)" is displayed is the % by number of the particles of 4.0 µm or less in the toner.

<Calculating Method for Amount of Coarse Powder>

An amount (% by volume) of coarse powder on the volume basis in the powder particles or the toner is calculated by analyzing data after the measurement with Multisizer 3.

For example, % by volume of particles of 10.0 µm or more in the toner is calculated by the following procedure. First, the chart of the measurement results is displayed in terms of % by volume by setting the dedicated software to "Graph/% by volume". Then, a check mark is placed in ">" of the particle diameter-setting portion on the screen of "Format/particle diameter/particle diameter statistics", and "10" is input in the particle diameter-inputting portion below the particle diameter-setting portion. The numerical value in the display portion of ">10 µm" when the screen of "Analysis/statistical value on volume (arithmetic average)" is displayed is the % by volume of the particles of 10.0 µm or more in the toner.

<Measurement Method of Average Circularity>

The average circularities of the powder particles and the toner are measured with a flow-type particle image analyzing apparatus "FPIA-3000" (manufactured by SYSMEX CORPORATION) under measurement and analysis conditions at the time of a calibration operation.

A specific measurement method is as follows. First, about 20 ml of ion-exchange water in which an impure solid and the like are previously removed is charged in a glass vessel. A diluted solution is prepared by diluting "Contaminon N" (a 10% by mass aqueous solution of a neutral detergent for washing a precision measuring device, including a nonionic surfactant, an anionic surfactant and an organic builder, and having a pH of 7, produced by Wako Pure Chemical Industries, Ltd.) with ion-exchange water by a factor of about 3 on a mass basis, and about 0.2 ml of the diluted solution is added into the vessel as a dispersing agent. About 0.02 g of a measurement specimen is further added and subjected to a dispersing treatment using an ultrasonic dispersion device for 2 minutes to obtain a dispersion for measurement. In this regard, the dispersion is appropriately cooled so as to have a temperature of 10° C. or higher and 40° C. or lower. A desk-top type ultrasonic washer disperser ("VS-150" (manufactured by Velvo-Clear Co., Ltd.)) with an oscillation frequency of 50 kHz and an electric output of 150 W is used as an ultrasonic dispersion device, a predetermined amount of ion-exchange water is charged in a water tank, and about 2 ml of the Contaminon N is added into the water tank.

For the measurement, the flow-type particle image analyzing apparatus with a standard objective lens (magnification: 10×) mounted was used and Particle Sheath "PSE-900A" (produced by SYSMEX CORPORATION) was used as a sheath fluid. The dispersion prepared according to the procedure is introduced into the flow-type particle image analyzing apparatus and 3000 toner particles are measured according to an HPF measurement mode and a total count mode. The average circularity of the toner or the powder particles is determined with a binarization threshold at the time of particle analysis being set to 85% and particle diameters to be analyzed being limited to diameters each corresponding to a circle-equivalent diameter of 1.985 µm or more and less than 39.69 µm.

When measuring, prior to initiating the measurement, automatic focusing is performed by using standard latex particles (obtained by diluting "RESEARCH AND TEST PARTICLES Latex Microsphere Suspensions 5200A" produced by Duke Scientific with ion-exchange water). Thereafter, focusing can be carried out every two hours from the initiation of the measurement.

It is to be noted that, in Examples of the present application, a flow-type particle image analyzing apparatus which had been subjected to a calibration operation by SYSMEX CORPORATION, and which had received a calibration certificate issued by SYSMEX CORPORATION was used. The measurement was performed under the same measurement and analysis conditions as conditions at the time of the reception of the calibration certificate except that particle diameters to be analyzed were limited to diameters each corresponding to a circle-equivalent diameter of 1.985 µm or more and less than 39.69 µm.

<Calculating Method of Percentage of Particles with Circularity of 0.990 or More>

A percentage of particles having a circularity of 0.990 or more is used as an indicator exhibiting a circularity distribution, and expressed by a frequency (%). Specifically, a value obtained by adding a value of frequency (%) at 1.00 in a frequency table range and a value of frequency (%) at 0.990 to 1.000, in the average circularity of a toner measured by FPIA-3000 is used.

EXAMPLES

Polyester Resin 1

The following materials were weighed and added into a reaction tank equipped with a condenser tube, a stirrer and a nitrogen-introducing tube.

| | |
|---|---|
| Terephthalic acid | 17.6 parts by mass |
| Polyoxyethylene(2.2)-2,2-bis(4-hydroxyphenyl)propane | 76.2 parts by mass |
| Titanium dihydroxybis(triethanolaminate) | 0.2 parts by mass |

Thereafter, the resultant mixture was heated to 220° C. and reacted for 8 hours while introducing nitrogen and removing water generated. Thereafter, 1.5 parts by mass of trimellitic anhydride was added, heated to 180° C., and reacted for 4 hours to synthesize a polyester resin 1.

The polyester resin 1 had a weight average molecular weight (Mw) of 82400, a number average molecular weight (Mn) of 3300 and a peak molecular weight (Mp) of 8450, determined by GPC, and had a glass transition temperature (Tg) of 63° C. and a softening point (½ method) of 110° C.

(Production Example of Powder Particles for Toner)

| | |
|---|---|
| Polyester resin 1: | 100 parts by mass |
| Paraffin wax: | 6 parts by mass |
| (Peak Temperature of Maximum Endothermic Peak: 78° C.) | |
| Aluminum 3,5-di-t-butylsalicylate compound: | 1.0 part by mass |
| C.I. Pigment Blue 15: | 3.5 parts by mass |

The above materials were mixed by a Henschel mixer (FM-75 model) (manufactured by NIPPON COKE & ENGINEERING CO., LTD.), and then kneaded by a twin-screw kneader (PCM-30 model) (manufactured by Ikegai, Corp.) where the temperature was set at 120° C. The kneaded product obtained was cooled and roughly pulverized by a hammer mill to 1 mm or less, and the pulverized product obtained was pulverized by a mechanical pulverizer T-250 (manufactured by Turbo Kogyo Co., Ltd.) to obtain fine particles. Subsequently, the obtained fine particles were classified by Faculty (manufactured by Hosokawa Micron Corporation).

The powder particles for toner obtained in this case had a weight average particle diameter (D4) of 6.5 μm, and an abundance of particles having a particle diameter of 4.0 μm or less, of 28.5% by number and an abundance of particles having a particle diameter of 10.0 μm or more, of 3.0% by volume in the powder particles.

Further, the circularity was measured by FPIA 3000, and as a result, the average circularity of the powder particles was 0.950 and the frequency of particles having a circularity of 0.990 or more was 1.5%.

Hereinafter, the powder particles will be designated as powder particles for toner A.

Further, the following materials were charged to a Henschel mixer (FM-75 model, manufactured by NIPPON COKE & ENGINEERING CO., LTD.), and mixed at a circumferential speed of a rotation blade of 50.0 m/sec and a mixing time of 3 minutes to obtain powder particles for toner B obtained by adhering silica and titanium oxide on the surfaces of the powder particles for toner A.

| | |
|---|---|
| Powder particles for toner A: | 100 parts by mass |
| Silica: | 3.0 parts by mass |
| (obtained by subjecting silica fine particles prepared by a sol-gel method to a surface treatment with 1.5% by mass of hexamethyldisilazane, and adjusting the particles by classification so as to have a desired particle size distribution) | |
| Titanium oxide: | 0.5 parts by mass |
| (obtained by subjecting metatitanic acid having anatase crystallinity to a surface treatment) | |

Example 1

In the present Example, the heat treating apparatus illustrated in FIG. 1 was used, the internal diameter of the apparatus was 450 mm, the rotating member in FIG. 3 was used, the angle θ of 7-a in FIG. 4 was 60°, a raw material-supplying unit was the unit in 8 ways in FIG. 5, and the powder particles for toner B were heat-treated. Herein, the cross-section shape of the regulating unit provided in the treating chamber was circular, and the regulating unit having a circular cross-section was used also in Examples described below.

In this case, the minimum interval G between the blades of the rotating member was 11.6 mm, the height was 30 mm, the number of the blades was 18, and the cross-sectional area of the outlet of the hot air-supplying unit was 6480 mm$^2$.

The cross-sectional area of the outlet of the raw material-supplying unit in this case was 640 mm$^2$ per outlet.

As illustrated in FIG. 1, cold air was supplied in a three-stage manner, each cold air in the first stage and second stage was supplied in a tangential direction in 4 ways, and cold air in the third stage was supplied in a tangential direction in 3 ways.

The above apparatus configuration will be designated as an apparatus configuration 1.

In the apparatus configuration 1, the powder particles for toner B were heat-treated in an amount of the powder particles for toner B to be supplied of 150 kg/hr and at a hot air temperature of 175° C. and a flow rate of hot air of 27.0 m$^3$/min so as to obtain heat-treated particles having an average circularity of 0.970.

The operation condition in this case was as follows: the cold air temperature was −5° C. and the flow rate of each injection air to be supplied from the high pressure air-supplying nozzle was 1.75 m$^3$/min.

In addition, 6.0 m$^3$/min of the cold air in the first stage was divided by 4, and 1.5 m$^3$/min of each cold air was supplied into the treating chamber. In addition, 2.0 m$^3$/min of the cold air in the second stage was divided by 4, and 0.5 m$^3$/min of each cold air was supplied into the treating chamber. In addition, 4.2 m$^3$/min of the cold air in the third stage was divided by 3, and 1.4 m$^3$/min of each cold air was supplied into the treating chamber.

The above operation condition will be designated as an operation condition 1.

Herein, under this condition, the air velocity of the hot air introduced from the rotating member of the hot air-supplying unit to the treating chamber was higher than the supply velocity of the powder introduced from the raw material-supplying unit to the treating chamber.

The heat-treated particles obtained in this case were heat-treated particles which had a weight average particle diameter (D4) of 6.8 μm, an abundance of particles having a particle diameter of 4.0 μm or less, of 25.3% by number and an abundance of particles having a particle diameter of 10.0 μm or more, of 3.8% by volume, and which contained very few coarse particles.

In addition, a frequency of particles having a circularity of 0.990 or more was measured by FPIA 3000 and as a result its value was 24.0%, and heat-treated particles very excellent in uniformity were obtained.

Then, the powder particles for toner B were heat-treated under the same condition as the operation condition 1 except that the amount of the powder particles for toner B to be supplied was 100 kg/hr and the hot air temperature was 160° C. as the operation condition of the heat treating apparatus, so as to have an average circularity of 0.970.

The heat-treated particles obtained had a weight average particle diameter (D4) of 6.6 μm, an abundance of particles having a particle diameter of 4.0 μm or less, of 27.2% by number and an abundance of particles having a particle diameter of 10.0 μm or more, of 3.3% by volume.

Herein, a difference Δs (% by volume) between the coarse powder amount of the heat-treated particles obtained and the coarse powder amount of the heat-treated particles obtained when the amount to be treated was 150 kg/hr was 0.5% by volume, and the apparatus configuration of the present Example resulted in very easily increasing the amount to be treated.

Subsequently, the powder particles for toner B were heat-treated under the same condition as the operation condition 1 except that the amount of the powder particles for toner B to be supplied was 150 kg/hr and the hot air temperature was 180° C. as the operation condition of the heat treating apparatus. The operation condition in this case will be designated as an operation condition 2.

The heat-treated particles obtained in this case had a weight average particle diameter (D4) of 6.8 μm, an abundance of particles having a particle diameter of 4.0 μm or less, of 25.1% by number and an abundance of particles having a particle diameter of 10.0 μm or more, of 4.2% by volume.

Further, the circularity was measured by FPIA 3000 and as a result the average circularity was 0.972, and heat-treated particles having a very high degree of sphericity were obtained.

After operating for 1 hour, when supplying of the powder particles for toner B was stopped and the presence of fusion in the apparatus was checked, no fused product was observed at all.

The following items were evaluated as for Example 1.

<Evaluation for Frequency of Particles with Circularity of 0.990 or More>

The following criteria were used to evaluate the obtained heat-treated particles for a frequency b (%) of particles having a circularity of 0.990 or more.
A: b<25.0
B: 25.0≤b<30.0
C: 30.0≤b<35.0
D: 35.0≤b<40.0
E: 40.0≤b <Evaluation for Amount of Coarse Powder>

As the evaluation for the amount of coarse powder in the heat-treated particles, the following criteria were used to determine a percentage s (% by volume) of particles of 10.0 μm or more in the heat-treated particles.
A: s<5.0
B: 5.0≤s<10.0
C: 10.0≤s<15.0
D: 15.0≤s<20.0
E: 20.0≤s <Evaluation for Variation in Amount of Coarse Powder when Increasing Amount to be Treated>

The percentage s' (% by volume) of particles of 10.0 μm or more in heat-treated particles obtained by a heat treatment at a decreased amount to be treated of 100 kg/hr, so that the average circularity was 0.970, was determined.

Then, a difference Δs (s–s') (% by volume) between the obtained s' and the above s was calculated and considered as an indicator for expressing ease of increasing the amount to be treated in the heat treating apparatus, and determined according to the following criteria.
A: 2.0<Δs
B: 2.0≤Δs<4.0
C: 4.0≤Δs<6.0
D: 6.0≤Δs<8.0
E: 8.0≤Δs <Evaluation for Average Circularity and Fusion>

An average circularity of the heat-treated particles obtained by a heat treatment at an amount to be treated of 150 kg/hr and a treatment temperature of 180° C., e, was evaluated according to the following criteria.
A: e≥0.970
B: 0.970<e≤0.965
C: 0.965<e≤0.960
D: 0.960<e≤0.955
E: e<0.955

After operating at an amount to be treated of 150 kg/hr and a treatment temperature of 180° C. for 1 hour, supplying of the powder particles for toner B was stopped and the presence of fusion in the apparatus was checked by inserting a scope part of an industrial videoscope "IPLEX SA II R" (manufactured by OLYMPUS CORPORATION) from an access port (not illustrated) at the side surface of the heat treating apparatus, and the presence of fusion was determined according to the following criteria.
A: no fused product was observed at all
B: fused product was slightly observed, but there was no problem in operation
C: fusion was observed, but there was no problem in operation
D: fusion was observed and operation needed to be stopped
E: large fused product was observed and operation needed to be stopped These results were summarized in Table 1.

Example 2

In the present Example, the heat treating apparatus illustrated in FIG. 1 was used, the apparatus was modified so that the minimum interval G between the blades of the rotating member in FIG. 3 was 30 mm, the height was 36 mm and the number of the blades was 9, and the cross-sectional area of the outlet of the hot air-supplying unit was 9720 mm$^2$. The powder particles for toner B were heat-treated under the operation condition 1 by using the same apparatus configuration as the apparatus configuration 1 except that the cross-sectional area of the outlet of the powder particle-supplying unit was 160 mm$^2$.

Under this condition, the air velocity of the hot air introduced from the rotating member of the hot air-supplying unit to the treating chamber was equal to the supply velocity of the powder introduced from the raw material-supplying unit to the treating chamber. Herein, the apparatus configuration in this case was designated as an apparatus configuration 2.

The heat-treated particles obtained in this case were heat-treated particles which had a weight average particle diameter (D4) of 6.8 μm, an abundance of particles having a particle diameter of 4.0 μm or less, of 24.8% by number and an abundance of particles having a particle diameter of 10.0 μm or more, of 4.2% by volume, and which contained very few coarse particles.

In addition, a frequency of particles having a circularity of 0.990 or more was measured by FPIA 3000 and as a result its value was 24.4%, and heat-treated particles very excellent in uniformity were obtained.

Then, the powder particles for toner B were heat-treated under the same condition as the operation condition 1 except that the amount of the powder particles for toner B to be supplied was 100 kg/hr and the hot air temperature was 160° C. as the operation condition of the heat treating apparatus, so as to have an average circularity of 0.970.

The heat-treated particles obtained had a weight average particle diameter (D4) of 6.6 μm, an abundance of particles having a particle diameter of 4.0 μm or less, of 26.9% by number and an abundance of particles having a particle diameter of 10.0 μm or more, of 3.5% by volume.

Herein, the difference Δs (% by volume) between the coarse powder amounts of the heat-treated particles obtained was 0.7% by volume, and the apparatus configuration of the present Example resulted in very easily increasing the amount to be treated.

Subsequently, the powder particles for toner B were heat-treated in the present apparatus configuration 2 under the operation condition 2 as the operation condition, and the heat-treated particles obtained had a weight average particle diameter (D4) of 6.8 μm, an abundance of particles having a particle diameter of 4.0 μm or less, of 24.5% by number and an abundance of particles having a particle diameter of 10.0 μm or more, of 4.6% by volume.

Further, the circularity was measured by FPIA 3000 and as a result the average circularity was 0.971, and heat-treated particles having a very high degree of sphericity were obtained.

After operating for 1 hour, when supplying of the powder particles for toner B was stopped and the presence of fusion in the apparatus was checked, no fused product was observed at all.

These results were summarized in Table 1.

Example 3

In the present Example, the powder particles for toner B were heat-treated using the heat treating apparatus illustrated in FIG. 1 in the same apparatus configuration as the apparatus configuration 2 except that the cross-sectional area of the outlet of the raw material-supplying unit was 140 mm$^2$, under the same condition as the operation condition 1 except that the hot air temperature was 180° C.

Under this condition, the air velocity of the hot air introduced from the rotating member of the hot air-supplying unit to the treating chamber was lower than the supply velocity of the powder introduced from the raw material-supplying unit to the treating chamber. Herein, the apparatus configuration in this case was designated as an apparatus configuration 3.

The heat-treated particles obtained in this case were heat-treated particles which had a weight average particle diameter (D4) of 6.9 μm, an abundance of particles having a particle diameter of 4.0 μm or less, of 24.6% by number and an abundance of particles having a particle diameter of 10.0 μm or more, of 4.5% by volume, and which contained very few coarse particles.

Further, a frequency of particles having a circularity of 0.990 or more was measured by FPIA 3000 and as a result its value was 24.5%, and heat-treated particles very excellent in uniformity were obtained.

Then, the powder particles for toner B were heat-treated under the same condition as the operation condition 1 except that the amount of the powder particles for toner B to be supplied was 100 kg/hr and the hot air temperature was 165° C. as the operation condition of the heat treating apparatus, so as to have an average circularity of 0.970.

The heat-treated particles obtained had a weight average particle diameter (D4) of 6.6 μm, an abundance of particles having a particle diameter of 4.0 μm or less, of 27.3% by number and an abundance of particles having a particle diameter of 10.0 μm or more, of 3.6% by volume.

Herein, the difference Δs (% by volume) between the coarse powder amounts of the heat-treated particles obtained was 0.9% by volume, and the apparatus configuration of the present Example resulted in very easily increasing the amount to be treated.

Subsequently, the powder particles for toner B were heat-treated in the present apparatus configuration 3 under the operation condition 2 as the operation condition, and the heat-treated particles obtained had a weight average particle diameter (D4) of 6.9 μm, an abundance of particles having a particle diameter of 4.0 μm or less, of 24.6% by number and an abundance of particles having a particle diameter of 10.0 μm or more, of 4.5% by volume.

Further, the circularity was measured by FPIA 3000 and as a result the average circularity was 0.970, and heat-treated particles having a very high degree of sphericity were obtained.

After operating for 1 hour, when supplying of the powder particles for toner B was stopped and the presence of fusion in the apparatus was checked, a fused product was slightly observed, but there was no problem in operation.

These results were summarized in Table 1.

Example 4

In the present Example, the powder particles for toner B were heat-treated in the same apparatus configuration as the apparatus configuration 3 except that the cold air-supplying unit 4-2 in the second stage of the heat treating apparatus illustrated in FIG. 1 was omitted to supply cold air in a two-stage manner.

The operation condition in this case was the same as the operation condition 1 except that the hot air temperature was 185° C. and the cold air in the second stage was not supplied. The operation condition in this case was designated as an operation condition 3.

Further, under this condition, the air velocity of the hot air introduced from the rotating member of the hot air-supplying unit to the treating chamber was lower than the supply velocity of the powder introduced from the raw material-supplying unit to the treating chamber. Herein, the apparatus configuration in this case was designated as an apparatus configuration 4.

The heat-treated particles obtained in this case were heat-treated particles which had a weight average particle diameter (D4) of 6.9 µm, an abundance of particles having a particle diameter of 4.0 µm or less, of 25.1% by number and an abundance of particles having a particle diameter of 10.0 µm or more, of 4.6% by volume, and which contained very few coarse particles.

Further, a frequency of particles having a circularity of 0.990 or more was measured by FPIA 3000 and as a result the frequency was 24.6%, and heat-treated particles very excellent in uniformity were obtained.

Then, the powder particles for toner B were heat-treated under the same condition as the operation condition 3 except that the amount of the powder particles for toner B to be supplied was 100 kg/hr and the hot air temperature was 170° C. as the operation condition of the heat treating apparatus, so as to have an average circularity of 0.970.

The heat-treated particles obtained had a weight average particle diameter (D4) of 6.6 µm, an abundance of particles having a particle diameter of 4.0 µm or less, of 27.2% by number and an abundance of particles having a particle diameter of 10.0 µm or more, of 3.7% by volume.

Herein, the difference Δs (% by volume) between the coarse powder amounts of the heat-treated particles obtained was 0.9% by volume, and the apparatus configuration of the present Example resulted in very easily increasing the amount to be treated.

Subsequently, the powder particles for toner B were heat-treated in the present apparatus configuration 4 under the condition that the hot air temperature of the operation condition 3 was changed to 180° C. The heat-treated particles obtained had a weight average particle diameter (D4) of 6.9 µm, an abundance of particles having a particle diameter of 4.0 µm or less, of 24.4% by number and an abundance of particles having a particle diameter of 10.0 µm or more, of 4.4% by volume.

Further, the circularity was measured by FPIA 3000 and as a result the average circularity was 0.969, and heat-treated particles having a high degree of sphericity were obtained.

After operating for 1 hour, when supplying of the powder particles for toner B was stopped and the presence of fusion in the apparatus was checked, a fused product was slightly observed, but there was no problem in operation.

These results were summarized in Table 1.

Example 5

In the present Example, the powder particles for toner B were heat-treated in the same apparatus configuration as the apparatus configuration 4 except that the cold air-supplying unit 4-3 in the third stage of the heat treating apparatus illustrated in FIG. 1 was omitted to supply cold air in a one-stage manner.

The operation condition in this case was the same as the operation condition 1 except that the hot air temperature was 185° C. and each cold air in the second stage and the third stage was not supplied. The operation condition in this case was designated as an operation condition 4.

Further, under this condition, the air velocity of the hot air introduced from the rotating member of the hot air-supplying unit to the treating chamber was lower than the supply velocity of the powder introduced from the raw material-supplying unit to the treating chamber. Herein, the apparatus configuration in this case was designated as an apparatus configuration 5.

The heat-treated particles obtained in this case were heat-treated particles which had a weight average particle diameter (D4) of 6.9 µm, an abundance of particles having a particle diameter of 4.0 µm or less, of 24.3% by number and an abundance of particles having a particle diameter of 10.0 µm or more, of 4.8% by volume, and which contained very few coarse particles.

Further, a frequency of particles having a circularity of 0.990 or more was measured by FPIA 3000 and as a result its value was 24.4%, and heat-treated particles very excellent in uniformity were obtained.

Then, the powder particles for toner B were heat-treated under the same condition as the operation condition 4 except that the amount of the powder particles for toner B to be supplied was 100 kg/hr and the hot air temperature was 170° C. as the operation condition of the heat treating apparatus, so as to have an average circularity of 0.970.

The heat-treated particles obtained had a weight average particle diameter (D4) of 6.7 µm, an abundance of particles having a particle diameter of 4.0 µm or less, of 26.8% by number and an abundance of particles having a particle diameter of 10.0 µm or more, of 3.8% by volume.

Herein, the difference Δs (% by volume) between the coarse powder amounts of the heat-treated particles obtained was 1.0% by volume, and the apparatus configuration of the present Example resulted in very easily increasing the amount to be treated.

Subsequently, the powder particles for toner B were heat-treated in the present apparatus configuration 5 under the condition that the hot air temperature of the operation condition 4 was changed to 180° C. The heat-treated particles obtained had a weight average particle diameter (D4) of 6.9 µm, an abundance of particles having a particle diameter of 4.0 µm or less, of 24.5% by number and an abundance of particles having a particle diameter of 10.0 µm or more, of 4.6% by volume.

Further, the circularity was measured by FPIA 3000 and as a result the average circularity was 0.969, and heat-treated particles having a high degree of sphericity were obtained.

After operating for 1 hour, when supplying of the powder particles for toner B was stopped and the presence of fusion in the apparatus was checked, fusion was observed, but there was no problem in operation.

These results were summarized in Table 1.

Example 6

In the present Example, the powder particles for toner B were heat-treated in the same apparatus configuration as the apparatus configuration 5 except that the raw material-supplying unit of the heat treating apparatus illustrated in FIG. 1 was changed to the unit in 4 ways in FIG. 5 and the raw materials were supplied by one high pressure air-supplying nozzle.

The operation condition in this case was the same as the operation condition 1 except that the hot air temperature was 190° C., each cold air in the second stage and the third stage was not supplied, and the flow rate of the injection air to be supplied from the high pressure air-supplying nozzle was 1.75 m³/min. The operation condition in this case was designated as an operation condition 5.

Further, under this condition, the air velocity of the hot air introduced from the rotating member of the hot air-supplying unit to the treating chamber was lower than the supply velocity of the powder introduced from the raw material-supplying unit to the treating chamber. Herein, the apparatus configuration in this case was designated as an apparatus configuration 6.

The heat-treated particles obtained in this case were heat-treated particles which had a weight average particle diameter (D4) of 7.1 µm, an abundance of particles having a particle diameter of 4.0 µm or less, of 24.0% by number and an abundance of particles having a particle diameter of 10.0 µm or more, of 7.3% by volume, and which contained few coarse particles.

Further, a frequency of particles having a circularity of 0.990 or more was measured by FPIA 3000 and as a result its value was 24.6%, and heat-treated particles very excellent in uniformity were obtained.

Then, the powder particles for toner B were heat-treated under the same condition as the operation condition 5 except that the amount of the powder particles for toner B to be supplied was 100 kg/hr and the hot air temperature was 175° C. as the operation condition of the heat treating apparatus, so as to have an average circularity of 0.970.

The heat-treated particles obtained had a weight average particle diameter (D4) of 6.8 µm, an abundance of particles having a particle diameter of 4.0 µm or less, of 26.6% by number and an abundance of particles having a particle diameter of 10.0 µm or more, of 3.9% by volume.

Herein, the difference Δs (% by volume) between the coarse powder amounts of the heat-treated particles obtained was 3.4% by volume, and the apparatus configuration of the present Example resulted in easily increasing the amount to be treated.

Subsequently, the powder particles for toner B were heat-treated in the present apparatus configuration 6 under the condition that the hot air temperature of the operation condition 5 was changed to 180° C. The heat-treated particles obtained had a weight average particle diameter (D4) of 7.0 µm, an abundance of particles having a particle diameter of 4.0 µm or less, of 24.1% by number and an abundance of particles having a particle diameter of 10.0 µm or more, of 7.1% by volume.

Further, the circularity was measured by FPIA 3000 and as a result the average circularity was 0.967, and heat-treated particles having a high degree of sphericity were obtained.

After operating for 1 hour, when supplying of the powder particles for toner B was stopped and the presence of fusion in the apparatus was checked, fusion was observed, but there was no problem in operation.

These results were summarized in Table 1.

Example 7

In the present Example, the powder particles for toner B were heat-treated in the same apparatus configuration as the apparatus configuration 6 except that the raw material-supplying unit of the heat treating apparatus illustrated in FIG. 1 was changed to the unit in 2 ways in FIG. 5.

The operation condition in this case was the same as the operation condition 1 except that the hot air temperature was 195° C., each cold air in the second stage and the third stage was not supplied, and the flow rate of the injection air to be supplied from the high pressure air-supplying nozzle was 0.88 m³/min. The operation condition in this case was designated as an operation condition 6.

Further, under this condition, the air velocity of the hot air introduced from the rotating member of the hot air-supplying unit to the treating chamber was lower than the supply velocity of the powder introduced from the raw material-supplying unit to the treating chamber. Herein, the apparatus configuration in this case was designated as an apparatus configuration 7.

The heat-treated particles obtained in this case were heat-treated particles which had a weight average particle diameter (D4) of 7.3 µm, an abundance of particles having a particle diameter of 4.0 µm or less, of 23.9% by number and an abundance of particles having a particle diameter of 10.0 µm or more, of 8.1% by volume, and which contained few coarse particles.

Further, a frequency of particles having a circularity of 0.990 or more was measured by FPIA 3000 and as a result its value was 24.8%, and heat-treated particles very excellent in uniformity were obtained.

Then, the powder particles for toner B were heat-treated under the same condition as the operation condition 6 except that the amount of the powder particles for toner B to be supplied was 100 kg/hr and the hot air temperature was 180° C. as the operation condition of the heat treating apparatus, so as to have an average circularity of 0.970.

The heat-treated particles obtained had a weight average particle diameter (D4) of 6.9 µm, an abundance of particles having a particle diameter of 4.0 µm or less, of 26.9% by number and an abundance of particles having a particle diameter of 10.0 µm or more, of 4.0% by volume.

Herein, the difference Δs (% by volume) between the coarse powder amounts of the heat-treated particles obtained was 4.1% by volume.

Subsequently, the powder particles for toner B were heat-treated in the present apparatus configuration 7 under the condition that the hot air temperature of the operation condition 6 was changed to 180° C. The heat-treated particles obtained had a weight average particle diameter (D4) of 7.2 µm, an abundance of particles having a particle diameter of 4.0 µm or less, of 24.0% by number and an abundance of particles having a particle diameter of 10.0 µm or more, of 7.5% by volume.

Further, the circularity was measured by FPIA 3000 and as a result the average circularity was 0.965, and heat-treated particles having a high degree of sphericity were obtained.

After operating for 1 hour, when supplying of the powder particles for toner B was stopped and the presence of fusion in the apparatus was checked, fusion was observed, but there was no problem in operation.

These results were summarized in Table 1.

Example 8

In the present Example, the powder particles for toner B were heat-treated in the same apparatus configuration as the apparatus configuration 7 except that the raw material-supplying unit of the heat treating apparatus illustrated in FIG. 1 was used in one direction in FIG. 5.

The operation condition in this case was the same as the operation condition 1 except that the hot air temperature was 200° C., each cold air in the second stage and the third stage was not supplied, and the flow rate of the injection air to be supplied from the high pressure air-supplying nozzle was 0.44 m³/min. The operation condition in this case was designated as an operation condition 7.

Further, under this condition, the air velocity of the hot air introduced from the rotating member of the hot air-supplying unit to the treating chamber was lower than the supply velocity of the powder introduced from the raw material-supplying unit to the treating chamber. Herein, the apparatus configuration in this case was designated as an apparatus configuration 8.

The heat-treated particles obtained in this case were heat-treated particles which had a weight average particle diameter (D4) of 7.5 µm, an abundance of particles having a particle diameter of 4.0 µm or less, of 23.6% by number and an abundance of particles having a particle diameter of 10.0 µm or more, of 9.8% by volume, and which contained few coarse particles.

Further, a frequency of particles having a circularity of 0.990 or more was measured by FPIA 3000 and as a result its value was 26.0%, and heat-treated particles excellent in uniformity were obtained.

Then, the powder particles for toner B were heat-treated under the same condition as the operation condition 1 except that the amount of the powder particles for toner B to be supplied was 100 kg/hr and the hot air temperature was 185° C. as the operation condition of the heat treating apparatus, so as to have an average circularity of 0.970.

The heat-treated particles obtained had a weight average particle diameter (D4) of 7.0 µm, an abundance of particles having a particle diameter of 4.0 µm or less, of 26.4% by number and an abundance of particles having a particle diameter of 10.0 µm or more, of 5.0% by volume.

Herein, the difference Δs (% by volume) between the coarse powder amounts of the heat-treated particles obtained was 4.8% by volume.

Subsequently, the powder particles for toner B were heat-treated in the present apparatus configuration 8 under the condition that the hot air temperature of the operation condition 7 was changed to 180° C. The heat-treated particles obtained had a weight average particle diameter (D4) of 7.4 µm, an abundance of particles having a particle diameter of 4.0 µm or less, of 23.8% by number and an abundance of particles having a particle diameter of 10.0 µm or more, of 8.1% by volume.

Further, the circularity was measured by FPIA 3000 and as a result, heat-treated particles having an average circularity of 0.963 were obtained.

After operating for 1 hour, when supplying of the powder particles for toner B was stopped and the presence of fusion in the apparatus was checked, fusion was observed, but there was no problem in operation.

These results were summarized in Table 1.

Example 9

In the present Example, the powder particles for toner B were heat-treated in the same apparatus configuration as the apparatus configuration 8 except that the number of ways for the cold air in the first stage of the heat treating apparatus was changed to 2.

The operation condition in this case was as follows: the hot air temperature was 200° C., and 6.0 m³/min of the cold air in the first stage was divided by 2 so that each cold air at 3.0 m³/min was obtained. In addition, the operation condition was the same as the operation condition 1 except that each cold air in the second stage and the third stage was not supplied and the flow rate of the injection air to be supplied from the high pressure air-supplying nozzle was 0.44 m³/min. The operation condition in this case was designated as an operation condition 8. Further, under this condition, the air velocity of the hot air introduced from the rotating member of the hot air-supplying unit to the treating chamber was lower than the supply velocity of the powder introduced from the raw material-supplying unit to the treating chamber. Herein, the apparatus configuration in this case was designated as an apparatus configuration 9.

The heat-treated particles obtained in this case were heat-treated particles which had a weight average particle diameter (D4) of 7.6 µm, an abundance of particles having a particle diameter of 4.0 µm or less, of 23.4% by number and an abundance of particles having a particle diameter of 10.0 µm or more, of 11.6% by volume, and which contained few coarse particles.

Further, a frequency of particles having a circularity of 0.990 or more was measured by FPIA 3000 and as a result its value was 28.4%, and heat-treated particles excellent in uniformity were obtained.

Then, the powder particles for toner B were heat-treated under the same condition as the operation condition 8 except that the amount of the powder particles for toner B to be supplied was 100 kg/hr and the hot air temperature was 185° C. as the operation condition of the heat treating apparatus, so as to have an average circularity of 0.970.

The heat-treated particles obtained had a weight average particle diameter (D4) of 7.1 µm, an abundance of particles having a particle diameter of 4.0 µm or less, of 26.3% by number and an abundance of particles having a particle diameter of 10.0 µm or more, of 7.2% by volume.

Herein, the difference Δs (% by volume) between the coarse powder amounts of the heat-treated particles obtained was 4.4% by volume.

Subsequently, the powder particles for toner B were heat-treated in the present apparatus configuration 9 under the condition that the hot air temperature of the operation condition 8 was changed to 180° C. The heat-treated particles obtained had a weight average particle diameter (D4) of 7.5 µm, an abundance of particles having a particle diameter of 4.0 µm or less, of 23.7% by number and an abundance of particles having a particle diameter of 10.0 µm or more, of 9.3% by volume.

Further, the circularity was measured by FPIA 3000 and as a result, heat-treated particles having an average circularity of 0.963 were obtained.

After operating for 1 hour, when supplying of the powder particles for toner B was stopped and the presence of fusion in the apparatus was checked, fusion was observed, but there was no problem in operation.

These results were summarized in Table 1.

Example 10

In the present Example, the powder particles for toner B were heat-treated in the same apparatus configuration as the apparatus configuration 9 except that the cold air in the first stage of the heat treating apparatus illustrated in FIG. 1 was not divided and used in one direction.

The operation condition in this case was the same as the operation condition 1 except that the hot air temperature was 200° C., the cold air in the first stage was 6.0 m³/min, each cold air in the second stage and the third stage was not supplied, and the flow rate of the injection air to be supplied from the high pressure air-supplying nozzle was 0.44 m³/min. The operation condition in this case was designated as an operation condition 9.

Further, under this condition, the air velocity of the hot air introduced from the rotating member of the hot air-supplying unit to the treating chamber was lower than the supply velocity of the powder introduced from the raw material-supplying unit to the treating chamber. Herein, the apparatus configuration in this case was designated as an apparatus configuration 10.

The heat-treated particles obtained in this case were heat-treated particles which had a weight average particle diameter (D4) of 7.7 µm, an abundance of particles having a particle diameter of 4.0 µm or less, of 23.0% by number and an abundance of particles having a particle diameter of 10.0 µm or more, of 13.6% by volume, and which contained few coarse particles.

Further, a frequency of particles having a circularity of 0.990 or more was measured by FPIA 3000 and as a result, heat-treated particles having a frequency of 30.5% were obtained.

Then, the powder particles for toner B were heat-treated under the same condition as the operation condition 9 except that the amount of the powder particles for toner B to be supplied was 100 kg/hr and the hot air temperature was 190° C. as the operation condition of the heat treating apparatus, so as to have an average circularity of 0.970.

The heat-treated particles obtained had a weight average particle diameter (D4) of 7.3 µm, an abundance of particles having a particle diameter of 4.0 µm or less, of 26.0% by number and an abundance of particles having a particle diameter of 10.0 µm or more, of 8.5% by volume.

Herein, the difference Δs (% by volume) between the coarse powder amounts of the heat-treated particles obtained was 5.1% by volume.

Subsequently, the powder particles for toner B were heat-treated in the present apparatus configuration 10 under the condition that the hot air temperature of the operation condition 9 was changed to 180° C. The heat-treated particles obtained had a weight average particle diameter (D4) of 7.5 µm, an abundance of particles having a particle diameter of 4.0 µm or less, of 23.4% by number and an abundance of particles having a particle diameter of 10.0 µm or more, of 10.2% by volume.

Further, the circularity was measured by FPIA 3000 and as a result, heat-treated particles having an average circularity of 0.963 were obtained.

After operating for 1 hour, when supplying of the powder particles for toner B was stopped and the presence of fusion in the apparatus was checked, fusion was observed, but there was no problem in operation.

These results were summarized in Table 1.

Example 11

In the present Example, the same heat treatment as in Example 1 was performed except that the powder particles to be heat-treated were changed to powder particles for toner A.

The heat-treated particles obtained in this case were heat-treated particles which had a weight average particle diameter (D4) of 7.0 µm, an abundance of particles having a particle diameter of 4.0 µm or less, of 24.9% by number and an abundance of particles having a particle diameter of 10.0 µm or more, of 5.9% by volume, and which contained few coarse particles.

Further, a frequency of particles having a circularity of 0.990 or more was measured by FPIA 3000 and as a result its value was 25.3%, and heat-treated particles excellent in uniformity were obtained.

Then, the powder particles for toner A were heat-treated under the same condition as the operation condition 1 except that the amount of the powder particles for toner A to be supplied was 100 kg/hr and the hot air temperature was 165° C. as the operation condition of the heat treating apparatus, so as to have an average circularity of 0.970.

The heat-treated particles obtained had a weight average particle diameter (D4) of 6.6 µm, an abundance of particles having a particle diameter of 4.0 µm or less, of 27.6% by number and an abundance of particles having a particle diameter of 10.0 µm or more, of 3.8% by volume.

Herein, the difference Δs (% by volume) between the coarse powder amount of the heat-treated particles obtained and the coarse powder amount of the heat-treated particles obtained when the amount to be treated was 150 kg/hr was 2.1% by volume, and the apparatus configuration of the present Example resulted in easily increasing the amount to be treated.

Subsequently, the powder particles for toner A were heat-treated under the same condition as the operation condition 1 except that the amount of the powder particles for toner A to be supplied was 150 kg/hr and the hot air temperature was 180° C. as the operation condition of the heat treating apparatus.

The heat-treated particles obtained in this case had a weight average particle diameter (D4) of 7.0 µm, an abundance of particles having a particle diameter of 4.0 µm or less, of 24.0% by number and an abundance of particles having a particle diameter of 10.0 µm or more, of 6.4% by volume.

Further, the circularity was measured by FPIA 3000 and as a result the average circularity was 0.969, and heat-treated particles having a high degree of sphericity were obtained.

After operating for 1 hour, when supplying of the powder particles for toner A was stopped and the presence of fusion in the apparatus was checked, a fused product was slightly observed, but there was no problem in operation.

These results were summarized in Table 1.

Comparative Example 1

Figure 6:
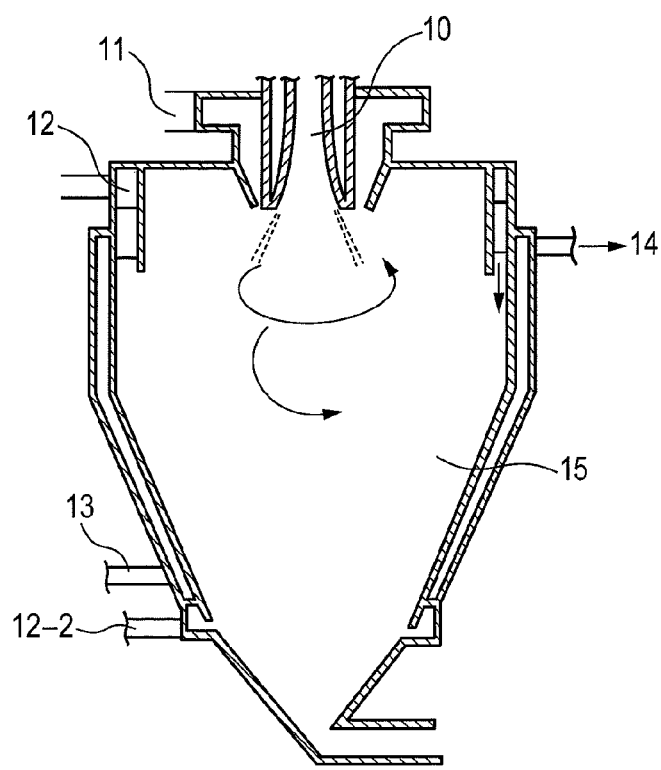
FIG. 6 is a schematic cross-sectional view of a heat treating apparatus to be used in Comparative Example 1.

In the present Comparative Example, the powder particles for toner B were heat-treated by the heat treating apparatus illustrated in FIG. 6.

In the heat treating apparatus in FIG. 6 used in the present Comparative Example, since a powder particle-supplying unit 10 is equipped with a turning chamber (not illustrated) upstream of the unit, the powder particles for toner B are introduced to a heat-treating chamber 15 with turning. The introduced powder particles for toner B are heat-treated by hot air supplied from a hot air-supplying unit 11 with turning in the same direction as the direction of the powder particles for toner B.

In the present Comparative Example, a method of supplying cold air is as follows: cold air is blown in from a first cold air-supplying unit 12 in a tangential direction with turning, and blown out perpendicularly in a slit manner along the shaft central direction of the heat-treating chamber by a perpendicularly guiding blade and a cooling-regulation plate (both not illustrated). Further, the heat-treated particles after the heat treatment are cooled by introducing cold air from a second cold air-supplying unit 12-2 with turning.

Herein, in the heat treating apparatus of the present Comparative Example, a jacket structure is provided on the outer peripheral portion of the apparatus, and a cooling medium is introduced from a cooling water inlet 13 and discharged from a cooling water outlet 14.

The above apparatus configuration will be designated as an apparatus configuration 11.

In the apparatus configuration, the powder particles for toner B were heat-treated in an amount of the powder particles for toner B to be treated of 150 kg/hr, and at a hot air temperature of 250° C. and a flow rate of hot air of 27.0 m³/min so as to obtain heat-treated particles having an average circularity of 0.970.

The operation condition in this case was as follows: the cold air temperature was −5° C. and the flow rate of the injection air to be supplied from the high pressure air-supplying nozzle was 3.5 m³/min.

As the cold air in the first stage, 6.0 m³/min of cold air was supplied into the treating chamber. In addition, as the second cold air, 4.2 m³/min of cold air was supplied into the treating chamber.

The above operation condition will be designated as an operation condition 10.

Herein, under this condition, the air velocity of the hot air introduced from the hot air-supplying unit to the treating chamber was lower than the supply velocity of the powder introduced from the raw material-supplying unit to the treating chamber.

The heat-treated particles obtained in this case were heat-treated particles which had a weight average particle diameter (D4) of 8.2 µm, an abundance of particles having a particle diameter of 4.0 µm or less, of 22.3% by number and an abundance of particles having a particle diameter of 10.0 µm or more, of 18.9% by volume, and which contained many coarse particles.

Further, a frequency of particles having a circularity of 0.990 or more was measured by FPIA 3000 and as a result, heat-treated particles having a frequency of 35.9% which lack in uniformity were obtained.

Then, the powder particles for toner B were heat-treated under the same condition as the operation condition 10 except that the amount of the powder particles for toner B to be supplied was 100 kg/hr and the hot air temperature was 220° C. as the operation condition of the heat treating apparatus, so as to have an average circularity of 0.970.

The heat-treated particles obtained had a weight average particle diameter (D4) of 7.6 µm, an abundance of particles having a particle diameter of 4.0 µm or less, of 23.5% by number and an abundance of particles having a particle diameter of 10.0 µm or more, of 12.6% by volume.

Herein, the difference Δs (% by volume) between the coarse powder amounts of the heat-treated particles obtained was 6.3% by volume, which resulted in hardly increasing the amount to be treated.

Subsequently, the powder particles for toner B were heat-treated in the present apparatus configuration 11 under the condition that the hot air temperature of the operation condition 10 was changed to 180° C. The heat-treated particles obtained had a weight average particle diameter (D4) of 7.9 µm, an abundance of particles having a particle diameter of 4.0 µm or less, of 23.1% by number and an abundance of particles having a particle diameter of 10.0 µm or more, of 16.4% by volume.

Further, the circularity was measured by FPIA 3000 and as a result, heat-treated particles having an average circularity of 0.958 and a low degree of sphericity were obtained.

After operating for 1 hour, when supplying of the powder particles for toner B was stopped and the presence of fusion in the apparatus was checked, fusion was observed and operation needed to be stopped.

These results are considered to be due to the fact that while the dispersing flow current and the heating flow current for the raw material were turning flows, the cooling air to be introduced was perpendicular, thereby generating a turbulent flow current in the apparatus to cause fusion in the apparatus. Further, in this apparatus configuration, since the heating flow current for the raw material is cooled by the dispersing flow current for the raw material, an excessive amount of heat is required to be applied for spheroidizing a toner. It is considered that an amount of heat that toner particles received in the apparatus varied due to the excessive amount of heat, and thus a uniform heat treatment could not be performed and a shape of a toner could not be made uniform.

These results were summarized in Table 1.

Comparative Example 2

Figure 7:
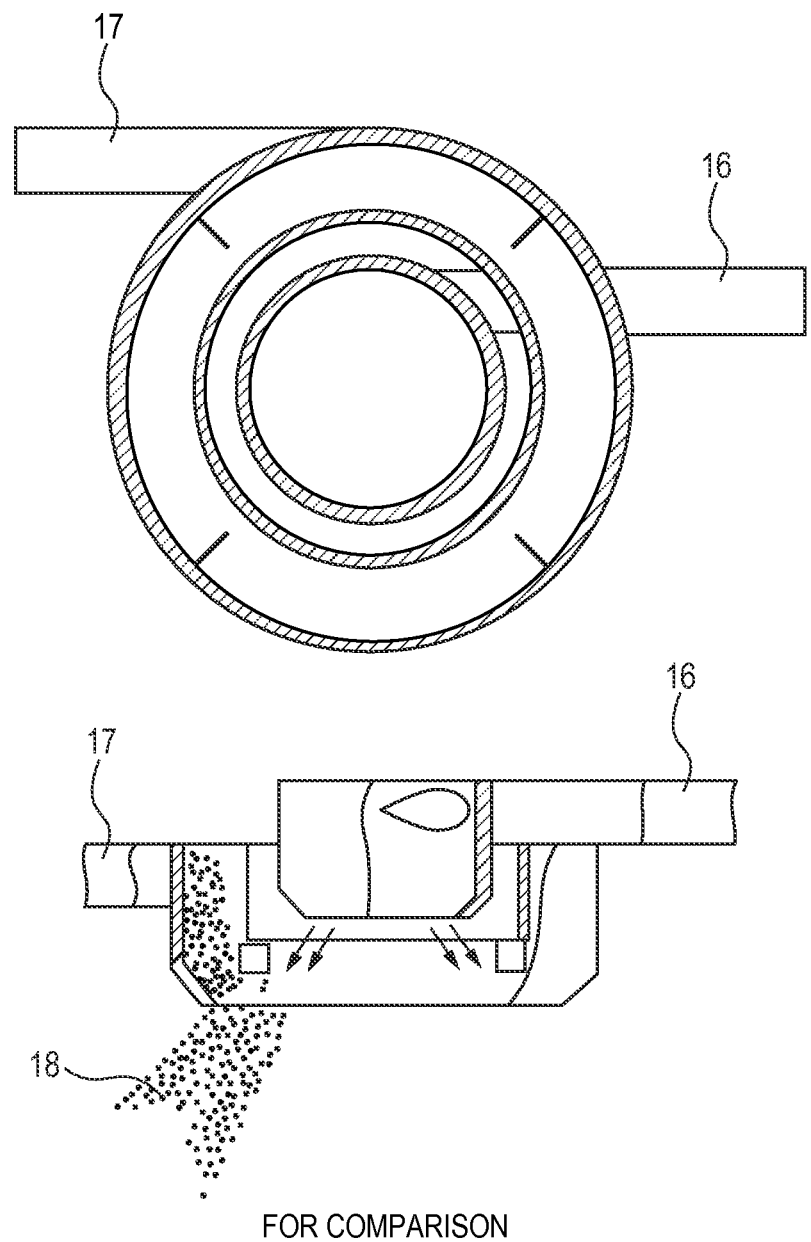
FIG. 7 is a schematic cross-sectional view of a heat treating apparatus to be used in Comparative Example 2.

In the present Comparative Example, the powder particles for toner B were heat-treated in the same apparatus configuration as the apparatus configuration 11 except that the hot air-supplying unit and the raw material-supplying unit of the heat treating apparatus illustrated in FIG. 6 were modified as in illustrated in FIG. 7.

In the heat treating apparatus used in the present Comparative Example, the hot air is supplied from a hot air-supplying unit 16 with turning. In addition, the powder particles for toner B are supplied from a powder particle-supplying unit 17 positioned outside of the hot air-supplying unit with turning in an opposite direction to the hot air.

The above apparatus configuration will be designated as an apparatus configuration 12.

In the apparatus configuration, the powder particles for toner B were heat-treated in an amount of the powder particles for toner B to be supplied of 150 kg/hr, and at a hot air temperature of 270° C. and a flow rate of hot air of 27.0 m³/min so as to obtain heat-treated particles having an average circularity of 0.970.

The operation condition in this case was as follows: the cold air temperature was −5° C. and the flow rate of the injection air to be supplied from the high pressure air-supplying nozzle was 3.5 m³/min.

As the cold air in the first stage, 6.0 m³/min of cold air was supplied into the treating chamber. In addition, as the second cold air, 4.2 m³/min of cold air was supplied into the treating chamber.

The above operation condition will be designated as an operation condition 12.

Herein, under this condition, the air velocity of the hot air introduced from the hot air-supplying unit to the treating chamber was lower than the supply velocity of the powder introduced from the raw material-supplying unit to the treating chamber.

The heat-treated particles obtained in this case were heat-treated particles which had a weight average particle diameter (D4) of 8.5 µm, an abundance of particles having a particle diameter of 4.0 µm or less, of 21.0% by number and an abundance of particles having a particle diameter of 10.0 µm or more, of 23.4% by volume, and which contained very many coarse particles.

Further, a frequency of particles having a circularity of 0.990 or more was measured by FPIA 3000 and as a result, heat-treated particles having a frequency of 41.8% which lack in uniformity were obtained.

Then, the powder particles for toner B were heat-treated under the same condition as the operation condition 11 except that the amount of the powder particles for toner B to be supplied was 100 kg/hr and the hot air temperature was 230° C. as the operation condition of the heat treating apparatus, so as to have an average circularity of 0.970.

The heat-treated particles obtained had a weight average particle diameter (D4) of 7.8 µm, an abundance of particles having a particle diameter of 4.0 µm or less, of 22.7% by number and an abundance of particles having a particle diameter of 10.0 µm or more, of 15.3% by volume.

Herein, the difference Δs (% by volume) between the coarse powder amounts of the heat-treated particles obtained was 8.1% by volume, which resulted in being unable to increase the amount to be treated.

Subsequently, the powder particles for toner B were heat-treated in the present apparatus configuration 12 under the condition that the hot air temperature of the operation condition 11 was changed to 180° C. The heat-treated particles obtained had a weight average particle diameter (D4) of 8.2 µm, an abundance of particles having a particle diameter of 4.0 µm or less, of 22.6% by number and an abundance of particles having a particle diameter of 10.0 µm or more, of 18.7% by volume.

Further, the circularity was measured by FPIA 3000 and as a result, heat-treated particles having an average circularity of 0.954 and a very low degree of sphericity were obtained.

After operating for 1 hour, when supplying of the powder particles for toner B was stopped and the presence of fusion in the apparatus was checked, a large fused product was observed and operation needed to be stopped.

These results are considered to be due to the fact that since the dispersing flow current and the heating flow current for the raw material were opposite to each other in terms of a turning direction, an increased amount of a toner to be treated caused the toner to adhere to the ceiling surface and the wall surface of the apparatus by a disturbance in flow current caused in the apparatus, thereby causing a fused product.

These results were summarized in Table 1.

<Production Example of Two-Component Developer>

The heat-treated particles obtained by setting an amount to be supplied to 150 kg/hr and an average circularity to 0.970 in Example 1, Example 11 and Comparative Example 1 were classified by a TSP separator (manufactured by Hosokawa Micron Corporation) so as to have a weight average particle diameter (D4) of 6.5 µm, and the respective particles were designated as toner particles 1, toner particles 2, and toner particles 3. 100.0 parts by mass of the obtained toner particles 1, 2, and 3 each was mixed with 0.8 parts by mass of titanium oxide obtained by subjecting metatitanic acid having anatase crystallinity to a surface treatment, by a Henschel mixer (FM-75 model, manufactured by NIPPON COKE & ENGINEERING CO., LTD.), to obtain toners 1, 2, and 3.

<Production Example of Magnetic Carrier>

A mixed liquid of 1 part by mass of a silicone resin (produced by Shin-Etsu Chemical Co., Ltd.: KR271), 0.5 parts by mass of γ-aminopropyltriethoxysilane and 98.5 parts by mass of toluene was added to 100 parts by mass of magnetite particles having a 50% particle diameter (D50) on the volume basis of 31 µm, and dried under reduced pressure at 75° C. for 5 hours with being stirred and mixed by a reduced pressure kneader for solution, to remove a solvent. Thereafter, the obtained product was fired at 145° C. for 2 hours, sieved by a sieve shaker (300 MM-2 model, manufactured by TSUTSUI SCIENTIFIC INSTRUMENTS CO., LTD.: aperture of 75 µm) to obtain a magnetic carrier. The D50 of the magnetic carrier was 34 µm.

Then, each of the prepared toners 1, 2, and 3 was combined with the magnetic carrier to prepare a two-component developer. The two-component developer was obtained by mixing the toner and the magnetic carrier in a blending ratio of 9 parts by mass of the toner to 100 parts by mass of the magnetic carrier with a V-type mixing machine for 5 minutes.

<Evaluation of Two-Component Developer>

The produced two-component developer was evaluated according to the following evaluation items.

A modified machine of a color copier, image RUNNER ADVANCE C7065 manufactured by Canon Inc., was used as an image forming apparatus.

As the image forming apparatus, a machine was used that had a process speed of 300 mm/sec and was modified so as to enable changing a developing contrast (Vcont) by a voltage applied to a sleeve of a developing device to thereby adjust an amount of a toner to be applied on paper in an FFH image (black area). The FFH image means a value where 256 levels of gray are expressed in hexadecimal number, and 00H represents the 1st level (white area) and FFH represents the 256th level of gray (black area). The content of further modification added for each evaluation item will be described in a section for describing each item. It is to be noted that the two-component developer was evaluated with being charged in a developing device for cyan of the image forming apparatus.

<Evaluation of Cleaning Properties>

For evaluation of cleaning properties, the image forming apparatus was modified so that a line pressure of a cleaning blade to a photosensitive drum was 1.3 times.

Paper used in the evaluation was plain paper CS-814 (A4, 81.4 g/m$^2$)(sold by Canon Marketing Japan Inc.) for color copier/printers. Under an environment of temperature 32° C./humidity 80% RH, a pattern image where the whole area on paper was black area and an amount of a toner applied on paper in the black area was 0.05 mg/cm$^2$ was output. In this case, the output was suspended at the points where 100 sheets were output and 100,000 sheets were output. Herein, a charging roller was replaced by a new charging roll at each point.

Thereafter, a pattern image where the whole area on paper was black area and an amount of a toner applied on paper in the black area was 0.02 mg/cm$^2$ was output.

A length of an image defect (white line) due to cleaning failure was measured for the obtained fixed image where an amount of a toner applied was 0.20 mg/cm$^2$ and the whole area was solid, and the cleaning properties were evaluated according to the following criteria.

A: no image defect due to cleaning failure was observed (very good)

B: image defect with a length of less than 1 mm was present (good)

C: image defect with a length of 1 mm or more and less than 2 mm was present (acceptable in the present invention)

D: image defect with a length of 2 mm or more was present (unacceptable in the present invention)

As a result, the cleaning properties of the toners 1, 2, and 3 were rated as A, B, and D, respectively.

These results were summarized in Table 1.

TABLE 1

| | | Apparatus configuration | | | | | | | Percentage | Percentage |
|---|---|---|---|---|---|---|---|---|---|---|
| | Relationship between Vh and Vt (m/sec) | Number of stages of cold air | Number of ways of cold air | | | Number of ways of raw material | Operation condition | | Weight average particle diameter (D4) | of particles of 4.0 µm or less (% by number) | of particles of 10.0 µm or more (% by volume) |
| | | | First stage | Second stage | Third stage | | Amount to be treated (kg/hr) | Treatment temperature (° C.) | | | |
| Example 1 | Vh > Vt | 3 | 4 | 4 | 3 | 8 | 150 | 175 | 6.8 | 25.3 | 3.8 |
| | | | | | | | 100 | 160 | 6.6 | 27.2 | 3.3 |
| | | | | | | | 150 | 180 | 6.8 | 25.1 | 4.2 |
| Example 2 | Vh = Vt | 3 | 4 | 4 | 3 | 8 | 150 | 175 | 6.8 | 24.8 | 4.2 |
| | | | | | | | 100 | 160 | 6.6 | 26.9 | 3.5 |
| | | | | | | | 150 | 180 | 6.8 | 24.5 | 4.6 |
| Example 3 | Vh < Vt | 3 | 4 | 4 | 3 | 8 | 150 | 180 | 6.9 | 24.6 | 4.5 |
| | | | | | | | 100 | 165 | 6.6 | 27.3 | 3.6 |
| | | | | | | | 150 | 180 | 6.9 | 24.6 | 4.5 |
| Example 4 | Vh < Vt | 2 | 4 | Null | 3 | 8 | 150 | 185 | 6.9 | 25.1 | 4.6 |
| | | | | | | | 100 | 170 | 6.6 | 27.2 | 3.7 |
| | | | | | | | 150 | 180 | 6.9 | 24.4 | 4.4 |

TABLE 1-continued

| Example | Vh vs Vt | c3 | c4 | c5 | c6 | c7 | c8 | c9 | c10 | c11 | c12 |
|---|---|---|---|---|---|---|---|---|---|---|---|
| Example 5 | Vh < Vt | 1 | 4 | Null | Null | 8 | 150 | 185 | 6.9 | 24.3 | 4.8 |
|  |  |  |  |  |  |  | 100 | 170 | 6.7 | 26.8 | 3.8 |
|  |  |  |  |  |  |  | 150 | 180 | 6.9 | 24.5 | 4.6 |
| Example 6 | Vh < Vt | 1 | 4 | Null | Null | 4 | 150 | 190 | 7.1 | 24.0 | 7.3 |
|  |  |  |  |  |  |  | 100 | 175 | 6.8 | 26.6 | 3.9 |
|  |  |  |  |  |  |  | 150 | 180 | 7.0 | 24.1 | 7.1 |
| Example 7 | Vh < Vt | 1 | 4 | Null | Null | 2 | 150 | 195 | 7.3 | 23.9 | 8.1 |
|  |  |  |  |  |  |  | 100 | 180 | 6.9 | 26.9 | 4.0 |
|  |  |  |  |  |  |  | 150 | 180 | 7.2 | 24.0 | 7.5 |
| Example 8 | Vh < Vt | 1 | 4 | Null | Null | 1 | 150 | 200 | 7.5 | 23.6 | 9.8 |
|  |  |  |  |  |  |  | 100 | 185 | 7.0 | 26.4 | 5.0 |
|  |  |  |  |  |  |  | 150 | 180 | 7.4 | 23.8 | 8.1 |
| Example 9 | Vh < Vt | 1 | 2 | Null | Null | 1 | 150 | 200 | 7.6 | 23.4 | 11.6 |
|  |  |  |  |  |  |  | 100 | 185 | 7.1 | 26.3 | 7.2 |
|  |  |  |  |  |  |  | 150 | 180 | 7.5 | 23.7 | 9.3 |
| Example 10 | Vh < Vt | 1 | 1 | Null | Null | 1 | 150 | 200 | 7.7 | 23.0 | 13.6 |
|  |  |  |  |  |  |  | 100 | 190 | 7.3 | 26.0 | 8.5 |
|  |  |  |  |  |  |  | 150 | 180 | 7.5 | 23.4 | 10.2 |
| Example 11 | Vh > Vt | 3 | 4 | 4 | 3 | 8 | 150 | 175 | 7.0 | 24.9 | 5.9 |
|  |  |  |  |  |  |  | 100 | 165 | 6.6 | 27.6 | 3.8 |
|  |  |  |  |  |  |  | 150 | 180 | 7.0 | 24.0 | 6.4 |
| Comparative Example 1 | Vh < Vt | 1 | 4 | 4 | 3 | 16 | 150 | 250 | 8.2 | 22.3 | 18.9 |
|  |  |  |  |  |  |  | 100 | 220 | 7.6 | 23.5 | 12.6 |
|  |  |  |  |  |  |  | 150 | 180 | 7.9 | 23.1 | 16.4 |
| Comparative Example 2 | Vh < Vt | 1 | 4 | 4 | 3 | 17 | 150 | 270 | 8.5 | 21.0 | 23.4 |
|  |  |  |  |  |  |  | 100 | 230 | 7.8 | 22.7 | 15.3 |
|  |  |  |  |  |  |  | 150 | 180 | 8.2 | 22.6 | 18.7 |

|  | Evaluation for coarse powder amount | Average circularity | Evaluation for circularity | Circularity of 0.990 or more (Frequency, %) | Frequency of particles having a circularity of 0.990 or more | Δs (% by volume) | Evaluation for Δs | Evaluation for fusion | Evaluation for cleaning |
|---|---|---|---|---|---|---|---|---|---|
| Example 1 | A | 0.970 | — | 24.0 | A | — | — | — | A |
|  | — | 0.970 | — | — | — | 0.5 | A | — | — |
|  | — | 0.972 | A | — | — | — | — | A | — |
| Example 2 | A | 0.970 | — | 24.4 | A | — | — | — | — |
|  | — | 0.970 | — | — | — | 0.7 | A | — | — |
|  | — | 0.971 | A | — | — | — | — | A | — |
| Example 3 | A | 0.970 | — | 24.5 | A | — | — | — | — |
|  | — | 0.970 | — | — | — | 0.9 | A | — | — |
|  | — | 0.970 | A | — | — | — | — | B | — |
| Example 4 | A | 0.970 | — | 24.6 | A | — | — | — | — |
|  | — | 0.970 | — | — | — | 0.9 | A | — | — |
|  | — | 0.969 | B | — | — | — | — | B | — |
| Example 5 | A | 0.970 | — | 24.4 | A | — | — | — | — |
|  | — | 0.970 | — | — | — | 1.0 | A | — | — |
|  | — | 0.969 | B | — | — | — | — | C | — |
| Example 6 | B | 0.970 | — | 24.6 | A | — | — | — | — |
|  | — | 0.970 | — | — | — | 3.4 | B | — | — |
|  | — | 0.967 | B | — | — | — | — | C | — |
| Example 7 | B | 0.970 | — | 24.8 | A | — | — | — | — |
|  | — | 0.970 | — | — | — | 4.1 | C | — | — |
|  | — | 0.965 | B | — | — | — | — | C | — |
| Example 8 | B | 0.970 | — | 26.0 | B | — | — | — | — |
|  | — | 0.970 | — | — | — | 4.8 | C | — | — |
|  | — | 0.963 | C | — | — | — | — | C | — |
| Example 9 | C | 0.970 | — | 28.4 | B | — | — | — | — |
|  | — | 0.970 | — | — | — | 4.4 | C | — | — |
|  | — | 0.963 | C | — | — | — | — | C | — |
| Example 10 | C | 0.970 | — | 30.5 | C | — | — | — | — |
|  | — | 0.970 | — | — | — | 5.1 | C | — | — |
|  | — | 0.963 | C | — | — | — | — | C | — |
| Example 11 | B | 0.970 | — | 25.3 | B | — | — | — | B |
|  | — | 0.970 | — | — | — | 2.1 | B | — | — |
|  | — | 0.969 | B | — | — | — | — | B | — |
| Comparative Example 1 | D | 0.970 | — | 35.9 | D | — | — | — | D |
|  | — | 0.970 | — | — | — | 6.3 | D | — | — |
|  | — | 0.958 | D | — | — | — | — | D | — |
| Comparative Example 2 | E | 0.970 | — | 41.8 | E | — | — | — | — |
|  | — | 0.970 | — | — | — | 8.1 | E | — | — |
|  | — | 0.954 | E | — | — | — | — | E | — |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-131144, filed Jun. 13, 2011, which is hereby incorporated by reference herein in its entirety.

REFERENCE SIGNS LIST

1: cylindrical treating chamber in which heat treatment is performed; 2: powder particle-supplying unit; 3: hot air-supplying unit; 3a: outlet of hot air-supplying unit; 4: cold air-supplying unit; 4-1: cold air-supplying unit in the first stage; 4-2: cold air-supplying unit in the second stage; 4-3: cold air-supplying unit in the third stage; 5: regulating unit for regulating flow of powder particles; 6: recovering unit; 7: substantially conic distributing member; 7-a: one example of substantially conic distributing member; 7-b: another example of substantially conic distributing member; 7-c: still another example of substantially conic distributing member; 8: rotating member; 9: blade of rotating member; 10: powder particle-supplying unit of apparatus to be used in Comparative Example 1; 11: hot air-supplying unit of apparatus to be used in Comparative Example 1; 12: first cold air-supplying unit of apparatus to be used in Comparative Example 1; 12-2: second cold air-supplying unit of apparatus to be used in Comparative Example 1; 13: cooling water inlet of apparatus to be used in Comparative Example 1; 14: cooling water outlet of apparatus to be used in Comparative Example 1; 15: heat treating chamber of apparatus to be used in Comparative Example 1; 16: hot air-supplying unit of apparatus to be used in Comparative Example 2; 17: powder particle-supplying unit of apparatus to be used in Comparative Example 2; and 18: powder particles

The invention claimed is:

1. A heat treating apparatus for powder particles, each of the powder particles comprising a binder resin and a colorant, the heat treating apparatus comprising:
   (1) a cylindrical treating chamber in which a heat treatment of the powder particles is performed;
   (2) a powder particle-supplying unit provided on an outer peripheral surface of the treating chamber that supplies the powder particles to the treating chamber from an outlet of the powder particle-supplying unit, the outlet being provided on an inner wall surface of the treating chamber;
   (3) a hot air-supplying unit that supplies hot air for heat-treating the supplied powder particles to the treating chamber;
   (4) a cold air-supplying unit that supplies cold air for cooling the heat-treated powder particles to the treating chamber;
   (5) a regulating unit provided on the treating chamber that regulates a flow of the supplied powder particles, the regulating unit being a columnar member having a circular cross-section and being arranged on a central axis of the treating chamber so as to protrude from a lower end portion of the treating chamber toward an upper end of the treating chamber, and comprising a conic distributing member that distributes the supplied hot air in a circumferential direction and a rotating member that rotates the distributed hot air along the inner wall surface of the treating chamber in a spiral manner; and
   (6) a recovering unit provided at a lower end portion side of the treating chamber, that recovers the heat-treated powder particles, wherein
   the conic distributing member and the rotating member are provided on the upper end portion of the regulating unit,
   the hot air-supplying unit has an outlet opposite to the conic distributing member and the rotating member,
   the powder particle-supplying unit is provided so that a direction of supplying the powder particles is the same as a direction of rotating the hot air with the supplied powder particles being supplied along the inner wall surface of the treating chamber, and
   the recovering unit is provided on the outer peripheral surface of the treating chamber so as to recover the powder particles while maintaining rotation of the powder particles rotating in a spiral manner in the treating chamber.

2. The heat treating apparatus for powder particles according to claim 1, comprising a plurality of the cold air-supplying units are provided on the outer peripheral surface of the treating chamber, wherein
   each of the cold air-supplying units is provided so that cold air to be supplied from the cold air-supplying unit is supplied in the same direction as the direction of rotating hot air along an inner peripheral surface of the treating chamber.

3. The heat treating apparatus for powder particles according to claim 1, comprising a plurality of the powder particle-supplying units provided in the same circumferential direction.

4. A method of producing a toner by using a heat-treating apparatus to heat-treat powder particles, each of which contains a binder resin and a colorant, wherein
   the heat-treating apparatus is the heat treating apparatus for powder particles according to claim 1.

5. The method of producing a toner according to claim 4, wherein the hot air is introduced from the rotating member to the treating chamber at an air velocity Vh (m/s) that is equal to or higher than a supply velocity Vt (m/s) of the powder particles introduced from the powder particle-supplying unit to the treating chamber.

6. The heat treating apparatus for powder particles according to claim 2, comprising a plurality of the powder particle-supplying units provided in the same circumferential direction.

7. A method of producing a toner by using a heat-treating apparatus to heat-treat powder particles, each of which contains a binder resin and a colorant, wherein
   the heat-treating apparatus is the heat treating apparatus for powder particles according to claim 2.

8. A method of producing a toner by using a heat-treating apparatus to heat-treat powder particles, each of which contains a binder resin and a colorant, wherein
   the heat-treating apparatus is the heat treating apparatus for powder particles according to claim 3.

9. A method of producing a toner by using a heat-treating apparatus to heat-treat powder particles, each of which contains a binder resin and a colorant, wherein
   the heat-treating apparatus is the heat treating apparatus for powder particles according to claim 6.

10. The method of producing a toner according to claim 7, wherein the hot air is introduced from the rotating member to the treating chamber at an air velocity Vh (m/s) that is equal to or higher than a supply velocity Vt (m/s) of the powder particles introduced from the powder particle-supplying unit to the treating chamber.

11. The method of producing a toner according to claim 8, wherein the hot air is introduced from the rotating member to the treating chamber at an air velocity Vh (m/s) that is equal to or higher than a supply velocity Vt (m/s) of the powder particles introduced from the powder particle-supplying unit to the treating chamber.

12. The method of producing a toner according to claim 9, wherein the hot air is introduced from the rotating member to the treating chamber at an air velocity Vh (m/s) that is equal to or higher than a supply velocity Vt (m/s) of the powder particles introduced from the powder particle-supplying unit to the treating chamber.

* * * * *